(12) United States Patent
Ukai et al.

(10) Patent No.: US 8,715,402 B2
(45) Date of Patent: May 6, 2014

(54) AIR POLLUTION CONTROL SYSTEM AND AIR POLLUTION CONTROL METHOD, SPRAY DRYING DEVICE OF DEWATERING FILTRATION FLUID FROM DESULFURIZATION DISCHARGED WATER, AND METHOD THEREOF

(75) Inventors: Nobuyuki Ukai, Tokyo (JP); Seiji Kagawa, Tokyo (JP); Tatsuto Nagayasu, Tokyo (JP); Naoyuki Kamiyama, Tokyo (JP); Toshihiro Fukuda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 236 days.

(21) Appl. No.: 13/149,328

(22) Filed: May 31, 2011

(65) Prior Publication Data

US 2012/0240761 A1 Sep. 27, 2012

(30) Foreign Application Priority Data

Mar. 22, 2011 (JP) ................................. 2011-063363
Mar. 28, 2011 (JP) ................................. 2011-071005

(51) Int. Cl.
*B01D 53/14* (2006.01)
*B01D 47/00* (2006.01)

(52) U.S. Cl.
USPC ........................... 96/234; 95/235; 423/243.08

(58) Field of Classification Search
None
See application file for complete search history.

(56) References Cited

U.S. PATENT DOCUMENTS

| | | | | |
|---|---|---|---|---|
| 5,624,530 A | * | 4/1997 | Sadykhov et al. | 159/3 |
| 6,058,624 A | * | 5/2000 | Bach et al. | 34/374 |
| 7,906,090 B2 | * | 3/2011 | Ukai et al. | 423/210 |
| 8,071,060 B2 | * | 12/2011 | Ukai et al. | 423/210 |
| 2010/0119428 A1 | * | 5/2010 | Nagayasu et al. | 423/243.08 |
| 2010/0329957 A1 | | 12/2010 | Nagayasu et al. | |
| 2011/0028551 A1 | * | 2/2011 | Levin et al. | 514/557 |
| 2011/0262331 A1 | * | 10/2011 | Ukai et al. | 423/235 |

FOREIGN PATENT DOCUMENTS

| | | | |
|---|---|---|---|
| EP | 0341580 A2 | * | 5/1989 |
| JP | 57-194083 A | | 11/1982 |
| JP | 57194083 A | * | 11/1982 |
| JP | 61-204633 U | | 12/1986 |
| JP | 63-200818 A | | 8/1988 |
| JP | 63200818 A | * | 8/1988 |

(Continued)

OTHER PUBLICATIONS

Translation of EP0341580A2.*

(Continued)

*Primary Examiner* — Robert Clemente
*Assistant Examiner* — Phillip Shao
(74) *Attorney, Agent, or Firm* — Westerman, Hattori, Daniels & Adrian, LLP

(57) ABSTRACT

To include a boiler 11 that burns fuel F, an air heater 13 that recovers heat of flue gas 18 from the boiler 11, a first precipitator 14 that reduces dust in the flue gas 18 after heat recovery, a desulfurizer 15 that reduces sulfur oxides in the flue gas 18 after dust reduction by an absorbent, a dewaterer 32 that reduces gypsum 31 from desulfurization discharged water 30 discharged from the desulfurizer 15, a spray drying device 34 including an atomizer that atomizes a dewatering filtration fluid 33 discharged from the dewaterer 32, and a flue-gas introducing line $L_{11}$ that introduces a part of the flue gas 18 into the spray drying device 34.

11 Claims, 22 Drawing Sheets

(56) References Cited

FOREIGN PATENT DOCUMENTS

| | | | |
|---|---|---|---|
| JP | 01-094920 A | | 4/1989 |
| JP | 05-212369 A | | 8/1993 |
| JP | 9-313881 A | | 12/1997 |
| JP | 09313881 A | * | 12/1997 |
| JP | 2001-129537 A | | 5/2001 |
| JP | 2008-246406 A | | 10/2008 |
| JP | 2008246406 A | * | 10/2008 |
| WO | 2006-030398 A1 | | 3/2006 |

OTHER PUBLICATIONS

Translation of JP63200818A.*
Translation of JP57194083A.*
Translation of JP 2008246406A.*
Translation of JP 09313881 A.*
Translation of EP0341580A2 May 1989 accessed Jun. 28, 2013.*
Translation of JP63200818A Aug. 1988 accessed Jun. 28, 2013.*
Translation of JP57194083A Nov. 1982 accessed Jun. 28, 2013.*
Translation of JP 2008246406A Oct. 2008 accessed Jun. 28, 2013.*
Translation of JP 09313881 A Dec. 1997 accessed Jun. 28, 2013.*
International Search Report of corresponding PCT Application No. PCT/JP2012/057037, mailing date Jun. 26, 2012.
Written Opinion of corresponding PCT Application No. PCT/JP2012/057037, mailing date Jun. 26, 2012.

* cited by examiner

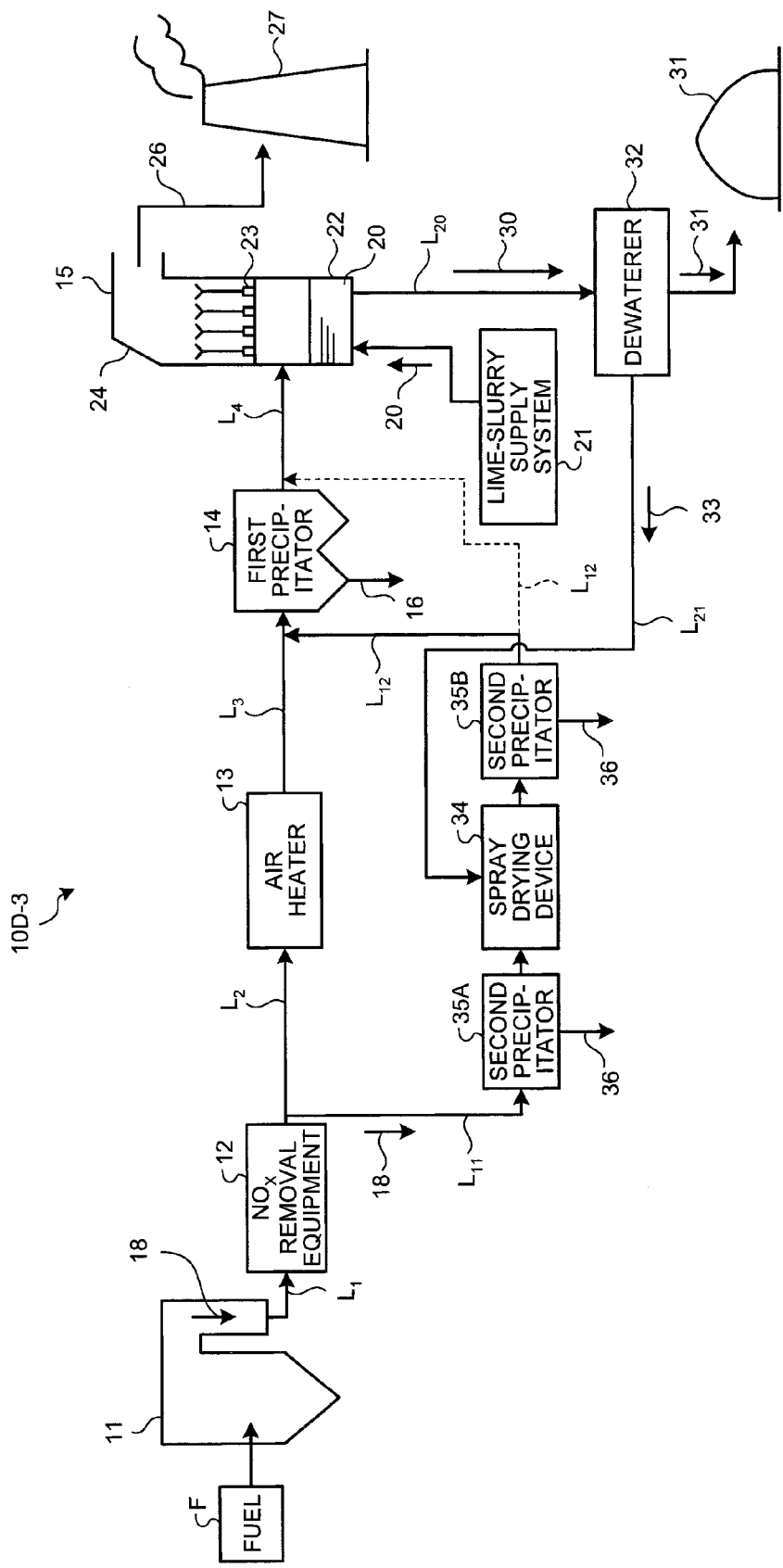

AIR POLLUTION CONTROL SYSTEM AND AIR POLLUTION CONTROL METHOD, SPRAY DRYING DEVICE OF DEWATERING FILTRATION FLUID FROM DESULFURIZATION DISCHARGED WATER, AND METHOD THEREOF

TECHNICAL FIELD

The present invention relates to an air pollution control system that treats flue gas discharged from a boiler, an air pollution control method, a spray drying device of a dewatering filtration fluid from desulfurization discharged water, and a method thereof.

BACKGROUND ART

Conventionally, there has been known an air pollution control system for treating flue gas discharged from a boiler installed in a thermal power generation plant or the like. The air pollution control system includes $NO_x$ removal equipment that removes nitrogen oxides from flue gas discharged from a boiler, an air heater that recovers heat of flue gas having passed through the $NO_x$ removal equipment, a precipitator that reduces dust in the flue gas after heat recovery, and a desulfurizer that reduces sulfur oxides in the flue gas after dust reduction. As the desulfurizer, a wet desulfurizer that reduces sulfur oxides in flue gas by bringing a lime absorbent into gas-liquid contact with flue gas has been generally used.

Waste water discharged from a wet desulfurizer (hereinafter, "desulfurization discharged water") contains various types of harmful substances, for example, ions such as chlorine ion and ammonium ion and mercury in large amount. Therefore, these harmful substances need to be removed from the desulfurization discharged water before the desulfurization discharged water is discharged to outside of the system. However, a removing process of these various types of harmful substances contained in the desulfurization discharged water is complicated, and treatment cost is high. Therefore, to reduce the treatment cost of the desulfurization discharged water, there has been proposed a method of reusing the desulfurization discharged water in the system without discharging it to the outside of the system. For example, Patent Literature 1 discloses an air pollution control system in which a device that atomizes and gasifies desulfurization discharged water is separately installed, branched from a flue gas duct of a main line that connects $NO_x$ removal equipment, an air heater, a precipitator, and a desulfurizer, and after a part of flue gas is introduced from the flue gas duct of the main line into the device, and desulfurization discharged water is atomized into flue gas in the device and evaporated to precipitate harmful substances, the flue gas is returned to the flue gas duct of the main line (Patent Literatures 1 and 2).

CITATION LIST

Patent Literature

[PTL 1] JP S63-200818A
[PTL 2] JP H9-313881A

SUMMARY OF INVENTION

Technical Problem

In the air pollution control systems described in Patent Literatures 1 and 2, a device that partially branches flue gas from a flue gas duct, and atomizes desulfurization discharged water (or effluent) from a desulfurizer to effect gasification is provided to evaporate desulfurization discharged water. However, because desulfurization discharged water from the desulfurizer contains solid contents, spray drying cannot be performed satisfactorily.

Furthermore, in recent years, zero liquid discharge in air pollution control systems has been desired due to the environmental concerns with respect to water resources in inland areas and the like, and there has also been desired an air pollution control system that can promote zero liquid discharge to ensure stable operations.

As a device for implementing zero liquid discharge, a spray drying device that dries desulfurization discharged water can be used. However, when desulfurization discharged water is spray-dried, there are the following problems.

1) Problem Caused by Disturbance in Balance of Heat Quantity

To evaporate spray liquid, drying is promoted by heat transfer between the spray liquid and hot air; however, when spray liquid is excessive with respect to hot air, insufficient evaporation occurs.

2) Problem Caused by Coarsening of Droplet Size of Spray Liquid Due to Ash Deposition When ash is deposited at an end of a spray nozzle, the droplet size of spray liquid emitted from the nozzle changes, and generally coarsening of the droplet size occurs. The coarsened droplet has a small specific surface area for heat exchange with hot air, and heat exchange becomes slow, thereby causing evaporation delay.

The present invention has been achieved in view of the above problems, and an object of the present invention is to provide an air pollution control system that promotes zero liquid discharge to ensure stable operations, an air pollution control method, a spray drying device of a dewatering filtration fluid from desulfurization discharged water, and a method thereof.

Solution to Problem

According to an aspect of the present invention, an air pollution control system includes: a boiler that burns fuel; an air heater that recovers heat of flue gas from the boiler; a first precipitator that reduces dust in the flue gas after heat recovery; a desulfurizer that reduces sulfur oxides in the flue gas after dust reduction by an absorbent; a dewaterer that reduces gypsum from desulfurization discharged water discharged from the desulfurizer; a spray drying device including an atomizer that atomizes a dewatering filtration fluid discharged from the dewaterer; and a flue-gas introducing line that introduces a part of the flue gas into the spray drying device.

Advantageously, the air pollution control system further includes a solid-liquid separating unit that reduces suspended solids in a dewatering filtration fluid from the dewaterer.

Advantageously, the air pollution control system further includes a dewatering branch line that supplies a dewatering filtration fluid from the dewaterer to collected dust.

Advantageously, in the air pollution control system, the spray drying device is a solid-gas separating spray drying device.

Advantageously, the air pollution control system further includes a waste-water treatment device that reduces harmful substances in a dewatering filtration fluid discharged from the dewaterer.

Advantageously, in the air pollution control system, a second precipitator is provided either on an upstream side or a downstream side of the spray drying device provided in the flue-gas introducing line or on both sides.

Advantageously, in the air pollution control system, a branching position of the flue gas is on an upstream side of the air heater, and the flue gas from the spray drying device is returned to between the air heater and the first precipitator.

Advantageously, in the air pollution control system, a branching position of the flue gas is on an upstream side of the air heater, and the flue gas from the spray drying device is returned to between the air heater and the first precipitator or to a downstream side of the first precipitator.

Advantageously, in the air pollution control system, a branching position of the flue gas is between the air heater and the first precipitator, and flue gas from the spray drying device is returned to between the air heater and the first precipitator.

Advantageously, in the air pollution control system, a branching position of the flue gas is between the air heater and the first precipitator, and the flue gas from the spray drying device is returned to between the air heater and the first precipitator or to a downstream side of the first precipitator.

Advantageously, in the air pollution control system, a branching position of the flue gas is between the first precipitator and the desulfurizer, and the flue gas from the spray drying device is returned to between the air heater and the first precipitator or to a downstream side of the first precipitator.

Advantageously, in the air pollution control system, a branching position of the flue gas is between the first precipitator and the desulfurizer, and the flue gas from the spray drying device is returned to the first precipitator and the desulfurizer.

According to another aspect of the present invention, in an air pollution control method, after heat of flue gas from a boiler that burns fuel is recovered by an air heater, sulfur oxides contained in the flue gas after heat recovery are reduced by an absorbent in a desulfurizer, and a dewatering filtration fluid acquired by reducing gypsum from desulfurization discharged water discharged from the desulfurizer is spray-dried by a part of the flue gas.

Advantageously, in the air pollution control method, a separate liquid in which suspended solids in the dewatering filtration fluid are reduced is spray-dried.

Advantageously, in the air pollution control method, solids are reduced from the flue gas used for spray drying.

According to another aspect of the present invention, a spray drying device of a dewatering filtration fluid from desulfurization discharged water, includes: a spray nozzle that atomizes a dewatering filtration fluid from desulfurization discharged water into a spray drying device body; an introduction port provided on the spray drying device body to introduce flue gas for drying a spray liquid; a dry area provided in the spray drying device body to dry a dewatering filtration fluid by flue gas; a discharge port that discharges the flue gas having contributed to drying; and a deposit monitor that monitors an attached state of a deposit to the spray nozzle.

Advantageously, in the spray drying device of a dewatering filtration fluid from desulfurization discharged water, the deposit monitor monitors a growth state of ash deposit by using ultrasonic waves or a laser.

Advantageously, the spray drying device of a dewatering filtration fluid from desulfurization discharged water further includes a deposit removing unit that removes the deposit.

Advantageously, in the spray drying device of a dewatering filtration fluid from desulfurization discharged water, the deposit removing unit is a scraper movably provided on an outer circumference of the spray nozzle.

Advantageously, in the spray drying device of a dewatering filtration fluid from desulfurization discharged water, the deposit removing unit is a spray-nozzle cleaning unit.

Advantageously, the spray drying device of a dewatering filtration fluid from desulfurization discharged water further includes: thermometers provided in plural in a dry area to measure an internal temperature; a determining unit that determines whether a spray-dried state of a dewatering filtration fluid is favorable based on measurement results of the thermometers; and a control unit that adjusts the flue gas or the dewatering filtration fluid when it is determined that spray drying is not sufficient based on a determination made by the determining unit.

According to still another aspect of the present invention, an air pollution control system includes: a boiler that burns fuel; an air heater that recovers heat of flue gas from the boiler; a precipitator that reduces dust in the flue gas after heat recovery; a desulfurizer that reduces sulfur oxides in the flue gas after dust reduction by an absorbent; a dewaterer that reduces gypsum from desulfurization discharged water discharged from the desulfurizer; the spray drying device of claim 16 including an atomizer that atomizes a dewatering filtration fluid discharged from the dewaterer; and a flue-gas introducing line that introduces a part of the flue gas into the spray drying device.

Advantageously, the air pollution control system further includes a solid-liquid separating unit that reduces suspended solids in the dewatering filtration fluid discharged from the dewaterer.

According to still another aspect of the present invention, in a spray drying method of a dewatering filtration fluid from desulfurization discharged water, a dewatering filtration fluid from desulfurization discharged water is atomized into a spray drying device body and a spray liquid is dried by introduced flue gas, and an atomization state of a spray nozzle is confirmed to determine whether atomization of the dewatering filtration fluid is appropriate, and when the atomization is inappropriate, the spray nozzle is cleaned and ash deposit attached around the spray nozzle is removed.

Advantageously, in the spray drying method of a dewatering filtration fluid from desulfurization discharged water, a temperature distribution inside the spray drying device body is measured, a dried state is monitored by a temperature distribution in a direction of a gas flow, and when drying of the dewatering filtration fluid is not sufficient, supply amounts of flue gas and of the dewatering filtration fluid are adjusted.

Advantageous Effects of Invention

According to the air pollution control system and the air pollution control method of the present invention, the dewatering filtration fluid acquired by removing gypsum from the desulfurization discharged water separated from the desulfurizer is atomized by the spray drying device, by using flue gas from the boiler. Therefore, spray drying can be stably performed, thereby enabling to realize zero liquid discharge of the desulfurization discharged water from the desulfurizer.

According to the present invention, further, at the time of atomization by the spray drying device by using the desulfurization discharged water acquired by removing gypsum from the desulfurization discharged water separated from the desulfurizer, stable atomization can be performed while ascertaining a spray-dried state, and reducing the deposit when there is insufficient atomization. Accordingly, zero liquid discharge of the desulfurization discharged water from the desulfurizer can be realized.

BRIEF DESCRIPTION OF DRAWINGS

FIG. 4C is a schematic configuration diagram of still another air pollution control system according to the third embodiment.

DESCRIPTION OF EMBODIMENTS

Exemplary embodiments of the present invention will be explained below in detail with reference to the accompanying drawings. The present invention is not limited to the embodiments, and when there are a plurality of embodiments, embodiments that are constituted by combining these embodiments are also included in the scope of the invention. In addition, constituent elements in the following embodiments include those that can be easily assumed by persons skilled in the art or that are substantially equivalent.

[First Embodiment]

Figure 1:
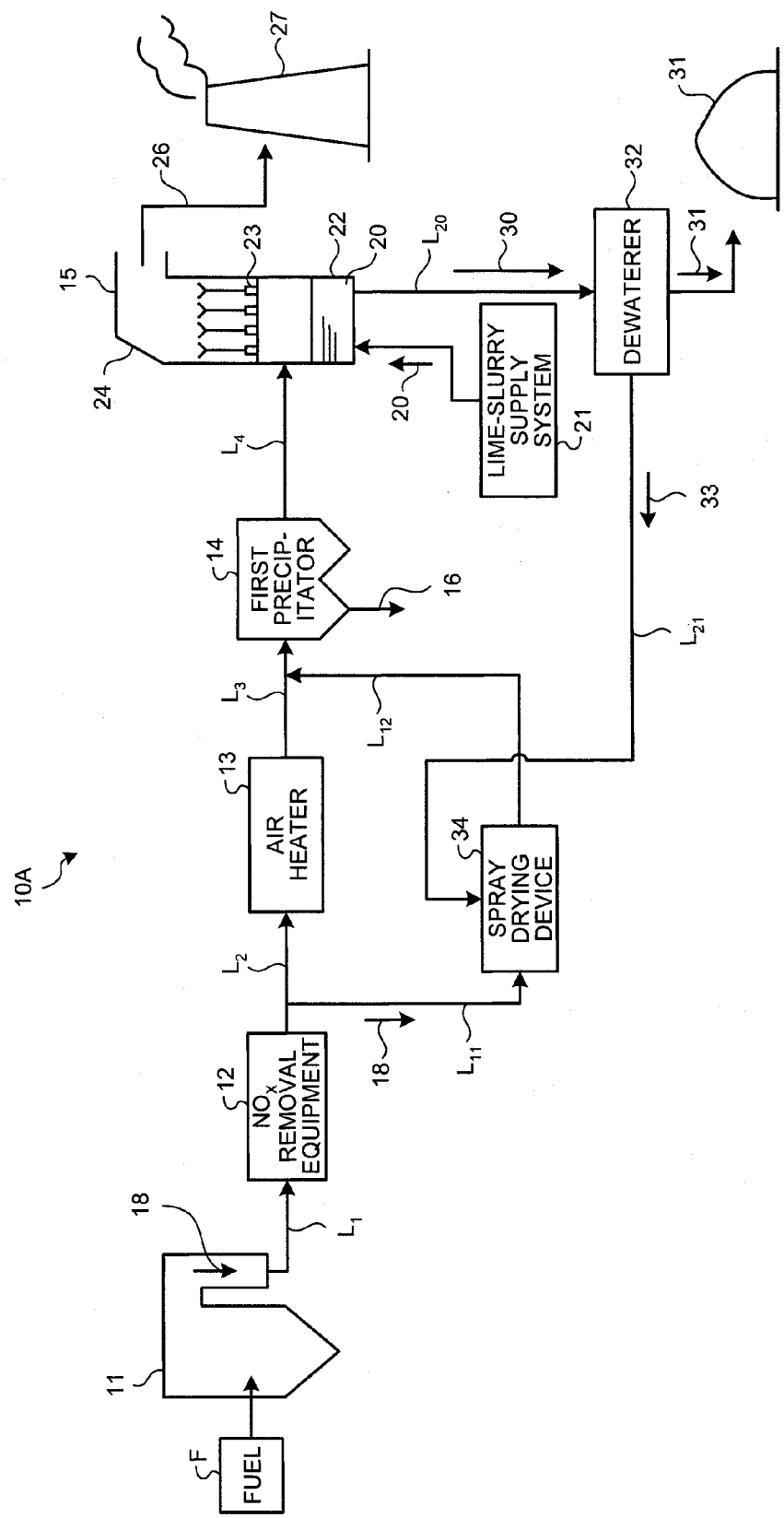
FIG. 1 is a schematic configuration diagram of an air pollution control system according to a first embodiment of the present invention.

FIG. 1 is a schematic configuration diagram of an air pollution control system according to a first embodiment of the present invention. An air pollution control system 10A exemplified in FIG. 1 removes harmful substances such as nitrogen oxides ($NO_x$), sulfur oxides ($SO_x$), and mercury (Hg) from flue gas 18 discharged from a boiler 11 such as a coal combustion boiler that uses coals as a fuel or a heavy-oil combustion boiler that uses heavy oil as a fuel.

The air pollution control system 10A includes the boiler 11 that combusts fuel F, an air heater 13 that recovers heat of the flue gas 18 from the boiler 11, a first precipitator 14 that reduces dust in the flue gas 18 after heat recovery, a desulfurizer 15 that reduces sulfur oxides in the flue gas 18 after dust reduction by a lime slurry 20, which is an absorbent, a dewaterer 32 that reduces gypsum 31 from desulfurization discharged water 30 discharged from the desulfurizer 15, a spray drying device 34 including an atomizer that atomizes a dewatering filtration fluid 33 from the dewaterer 32, and a flue-gas introducing line $L_{11}$ that introduces a part of the flue gas 18 into the spray drying device 34. Accordingly, because spray drying is performed by the spray drying device 34 by using the dewatering filtration fluid 33 in which the gypsum 31 is reduced, stable atomization can be performed.

Accordingly, clogging in the spray drying device 34 does not occur, and zero liquid discharge of a moisture content of the desulfurization discharged water can be stably performed.

$NO_x$ removal equipment 12 removes nitrogen oxides in the flue gas 18 supplied from the boiler 11 via a gas supply line $L_1$, and includes an $NO_x$ removal catalyst layer (not shown) therein. A reducing agent injector (not shown) is arranged on the upstream of the $NO_x$ removal catalyst layer, and a reducing agent is injected into the flue gas 18 from the reducing agent injector. As the reducing agent, for example, ammonia, urea, ammonium chloride are used. The flue gas 18 introduced into the $NO_x$ removal equipment 12 comes in contact with the $NO_x$ removal catalyst layer, and nitrogen oxides in the flue gas 18 are decomposed into nitrogen gas ($N_2$) and water ($H_2O$) and removed. When a chlorine (Cl) content in the flue gas 18 increases, the proportion of a bivalent mercury chloride soluble in water increases, and mercury can be easily collected by the desulfurizer 15 described later.

The $NO_x$ removal equipment 12 is not essential, and when a concentration of nitrogen oxides or mercury in the flue gas 18 from the boiler 11 is very small or these substances are not contained in the flue gas 18, the $NO_x$ removal equipment 12 can be omitted.

The air heater 13 is a heat exchanger that recovers heat in the flue gas 18, which is supplied via a gas supply line $L_2$, after nitrogen oxides have been removed by the $NO_x$ removal equipment 12. Because the temperature of the flue gas 18 having passed through the NO removal equipment 12 is as high as about 350° C. to 400° C., the air heater 13 performs heat exchange between the high-temperature flue gas 18 and combustion air at a normal temperature. Combustion air, which becomes a high temperature by heat exchange, is supplied to the boiler 11. On the other hand, the flue gas 18 having been heat-exchanged with combustion air at a normal temperature is cooled to about 150° C.

The first precipitator 14 reduces dust in the flue gas 18, which is supplied via a gas supply line $L_3$, after heat recovery. As the first precipitator 14, an inertial precipitator, a centrifugal precipitator, a filtering precipitator, an electric precipitator, and a cleaning precipitator can be mentioned; however, it is not particularly limited thereto.

The desulfurizer 15 reduces sulfur oxides in the flue gas 18, which is supplied via a gas supply line $L_4$, after dust reduction according to a wet method. In the desulfurizer 15, the lime slurry 20 (a solution in which limestone powder is dissolved in water) is used as an alkaline absorbent, and the temperature inside the desulfurizer is adjusted to about 30° C. to 80° C. The lime slurry 20 is supplied from a lime-slurry supply system 21 to a column bottom part 22 of the desulfurizer 15. The lime slurry 20 supplied to the column bottom part 22 of the desulfurizer 15 is supplied to a plurality of nozzles 23 in the desulfurizer 15 via an absorbent supply line (not shown), and is ejected from the nozzles 23 toward a column top part 24 of the desulfurizer 15. Because the flue gas 18 rising from the column bottom part 22 of the desulfurizer 15 comes in gas-liquid contact with the lime slurry 20 ejected from the nozzles 23, sulfur oxides and mercury chloride in the flue gas 18 are absorbed by the lime slurry 20, and separated and removed from the flue gas 18. The flue gas 18 purified by the lime slurry 20 is discharged from the column top part 24 of the desulfurizer 15 as purged gas 26, and discharged to outside of the system from a stack 27.

At the inside of the desulfurizer 15, sulfur oxides $SO_x$ in the flue gas 18 causes a reaction with the lime slurry 20 represented by the following expression (1).

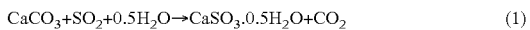

$$CaCO_3+SO_2+0.5H_2O \rightarrow CaSO_3.0.5H_2O+CO_2 \quad (1)$$

The lime slurry 20 that has absorbed $SO_x$ in the flue gas 18 is then oxidized by air (not shown) supplied to the column bottom part 22 of the desulfurizer 15, to cause a reaction with air represented by the following expression (2).

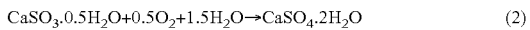

$$CaSO_3.0.5H_2O+0.5O_2+1.5H_2O \rightarrow CaSO_4.2H_2O \quad (2)$$

In this manner, $SO_x$ in the flue gas 18 is captured in a state of gypsum $CaSO_4.2H_2O$ in the desulfurizer 15.

As described above, while a solution accumulated in the column bottom part 22 of the desulfurizer 15 of a wet type and pumped is used as the lime slurry 20, gypsum. $CaSO_4.2H_2O$ is mixed in the lime slurry 20 to be pumped by an operation of the desulfurizer 15, according to the above reaction expressions (1) and (2). The lime gypsum slurry (a lime slurry mixed with gypsum) to be pumped is hereinafter referred to as "absorbent".

The absorbent (the lime gypsum slurry) used for desulfurization is discharged to outside from the column bottom part 22 of the desulfurizer 15 as the desulfurization discharged water 30, and supplied to the dewaterer 32 via a waste water line $L_{20}$ described later, where dewatering is performed. As well as gypsum 31, heavy metal such as mercury and halogen ions such as $Cl^-$, $Br^-$, $I^-$, and $F^-$ are included in the desulfurization discharged water 30.

The dewaterer 32 separates a solid content including the gypsum 31 in the desulfurization discharged water 30 and a liquid content of the dewatering filtration fluid 33. As the dewaterer 32, for example, a belt filter, a centrifugal separator, or a decanter-type centrifugal settler is used. The gypsum 31 in the desulfurization discharged water 30 discharged from the desulfurizer 15 is separated by the dewaterer 32. At this time, mercury chloride in the desulfurization discharged water 30 is separated from the liquid together with the gypsum 31 in a state of being adsorbed on the gypsum 31. The separated gypsum 31 is discharged to outside of the air pollution control system (hereinafter, "outside of the system").

On the other hand, the dewatering filtration fluid 33, which is separate liquid, is supplied to the spray drying device 34 via a dewatering line $L_{21}$. Alternatively, the dewatering filtration fluid 33 can be temporarily stored in a discharged water tank (not shown).

The spray drying device 34 includes a gas introducing unit into which a part of the flue gas 18 is introduced via the flue-gas introducing line $L_{11}$ branched from the gas supply line $L_2$, and an atomizer that sprays or atomizes the dewatering filtration fluid 33. The spray drying device 34 evaporates and dries the sprayed dewatering filtration fluid 33 by the heat of the introduced flue gas 18.

In the present invention, because the dewatering filtration fluid 33 acquired by removing the gypsum 31 from the desulfurization discharged water 30 is spray-dried, clogging in the atomizer can be prevented.

That is, because the desulfurization discharged water 30 is not directly atomized, an amount of dried particles generated due to evaporation of the desulfurization discharged water 30 can be considerably reduced. As a result, clogging caused by attachment of dried particles can be decreased. Further, because mercury chloride can be also separated and removed together with the gypsum 31 by dewatering the desulfurization discharged water 30, it can be prevented that a mercury concentration in the flue gas 18 increases at the time of atomizing discharged water.

In the first embodiment, because apart of flue gas flowing into the air heater 13 is branched from the gas supply line $L_2$ via the flue-gas introducing line $L_{11}$, the temperature of flue gas is high (350° C. to 400° C.), and spray drying of the dewatering filtration fluid 33 can be efficiently performed.

Figure 2:
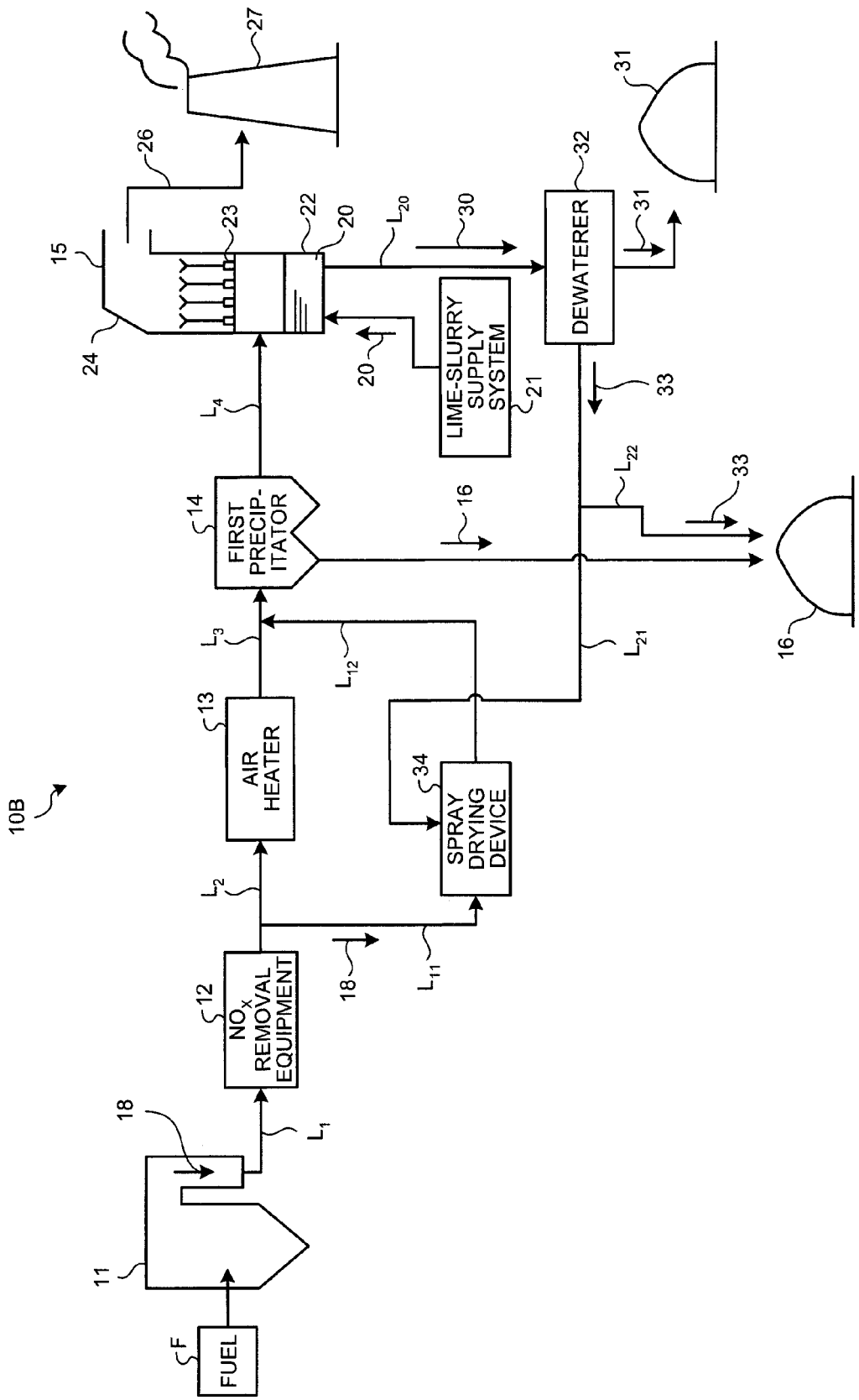
FIG. 2 is a schematic configuration diagram of another air pollution control system according to the first embodiment.

FIG. 2 is a schematic configuration diagram of another air pollution control system according to the first embodiment.

In an air pollution control system 10B shown in FIG. 2, a part of the dewatering filtration fluid 33 is atomized to collected dust 16 discharged from the first precipitator 14 via a dewatering branch line $L_{22}$ branched from the dewatering line $L_{21}$. A moisture content of the collected dust 16 after being atomized and mixed is preferably 15% at a maximum.

Accordingly, a part of the dewatering filtration fluid 33 can be reduced without performing spray drying.

In the collected dust 16 containing moisture, scattering of ash is prevented, to improve handling in ash disposal. Conventionally, industrial water in a facility has been atomized. Therefore, the cost for industrial water is not required, thereby enabling economical treatment.

[Second Embodiment]

Figure 3:
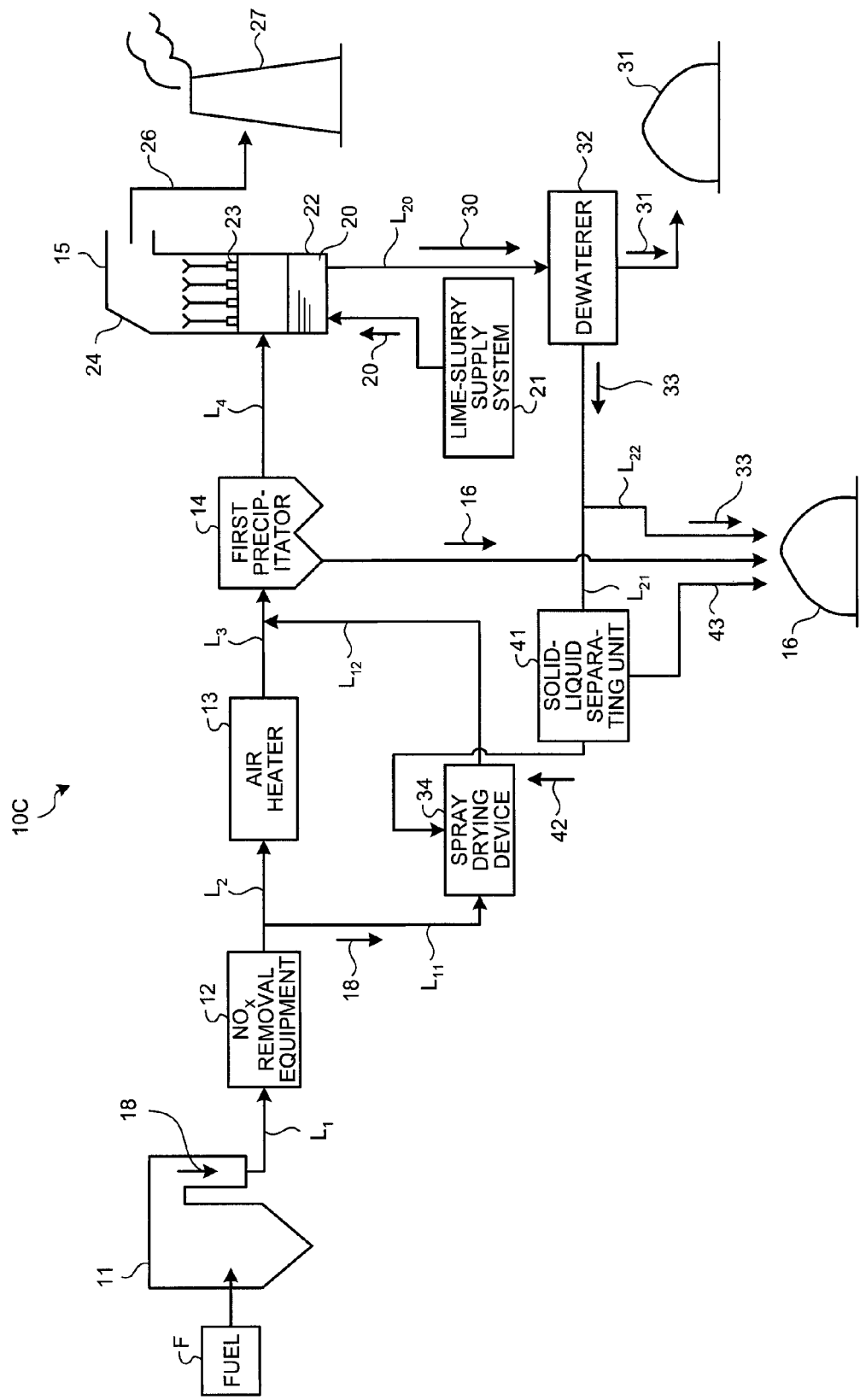
FIG. 3 is a schematic configuration diagram of an air pollution control system according to a second embodiment of the present invention.

An air pollution control system according to a second embodiment of the present invention is explained next. Constituent elements identical to those in the first embodiment described above are denoted by like reference signs, and explanations thereof will be omitted. FIG. 3 is a schematic configuration diagram of the air pollution control system according to the second embodiment. In an air pollution control system 10C according to the second embodiment, as shown in FIG. 3, a solid-liquid separating unit 41 that reduces suspended solids (SS) or suspended substance in the dewatering filtration fluid 33 is installed in the dewatering line $L_{21}$.

As the solid-liquid separating unit 41, for example, a hydraulic cyclone, a belt filter, a classifier, or a membrane separator can be mentioned.

The solid-liquid separating unit 41 reduces suspended solids (SS) in the dewatering filtration fluid 33 so that an SS concentration in a separate liquid 42 becomes equal to or less than 1% by weight, more preferably, from 0.1% to 0.5% by weight.

Accordingly, the SS concentration decreases, thereby enabling to further suppress clogging of nozzles and pipes in the spray drying device 34.

That is, by decreasing the SS concentration to a level equal to or less than 1% by weight, and more preferably, of from 0.1% to 0.5% by weight, insufficient atomization caused by attachment of atomized dry substances or attachment and growth of dust at the ends of the spray nozzles at the time of spray drying can be suppressed. As a result, such problems as shutdown due to blockage, and insufficient drying resulting from long drying time to be required due to coarsening of the droplet size of spray liquid can be resolved. Further, nonuniform drying and insufficient drying caused by a bias of an atomization range are resolved.

A separate residue 43 separated by the solid-liquid separating unit can be joined to the collected dust 16, so that moisture is contained therein by the dewatering filtration fluid 33.

When the collected dust 16 is used by itself separately, the collected dust 16 and the separate residue 43 can be put indifferent locations to perform atomization of the dewatering filtration fluid 33.

[Third Embodiment]

Figure 4A:
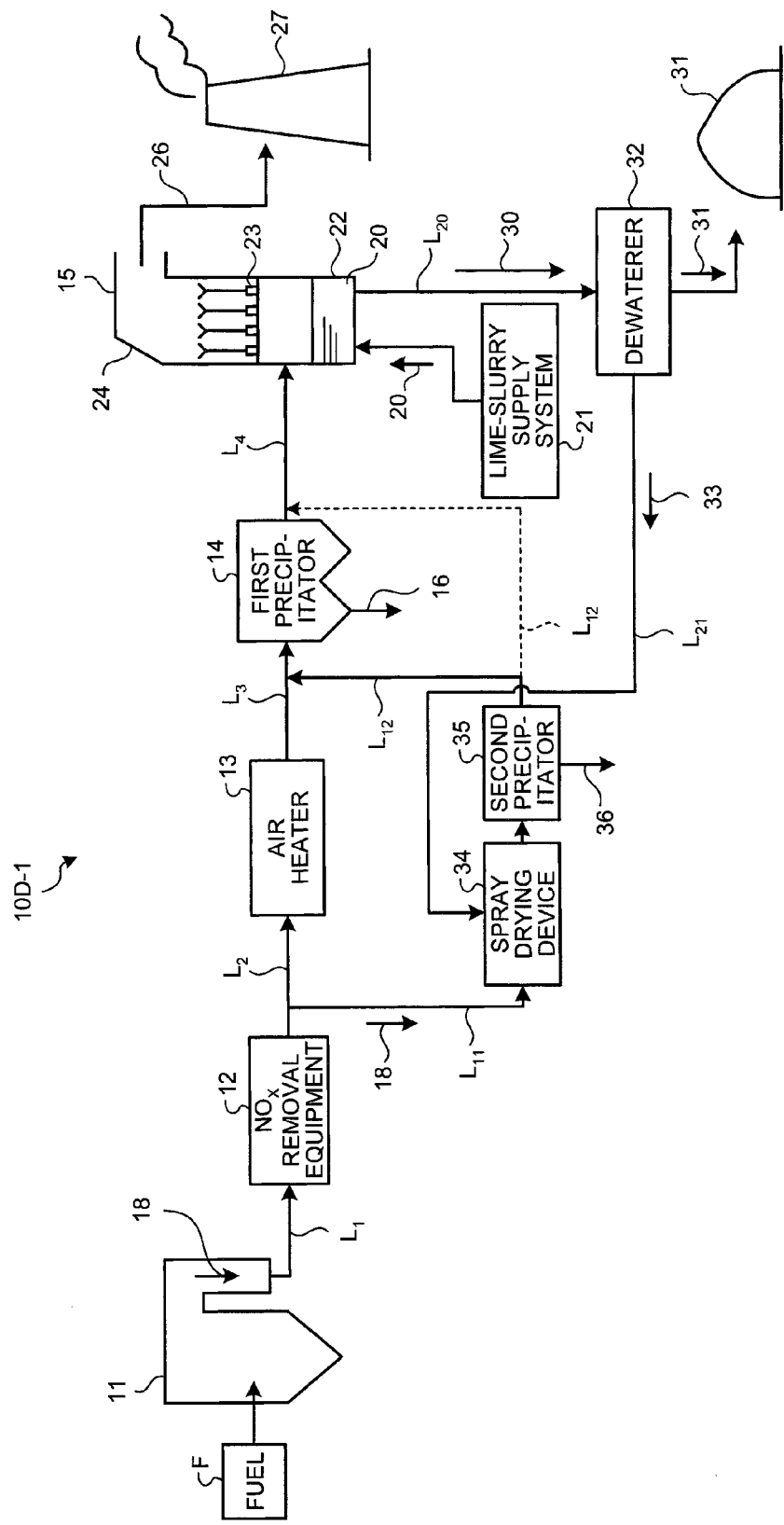
FIG. 4A is a schematic configuration diagram of an air pollution control system according to a third embodiment of the present invention.
Figure 4B:
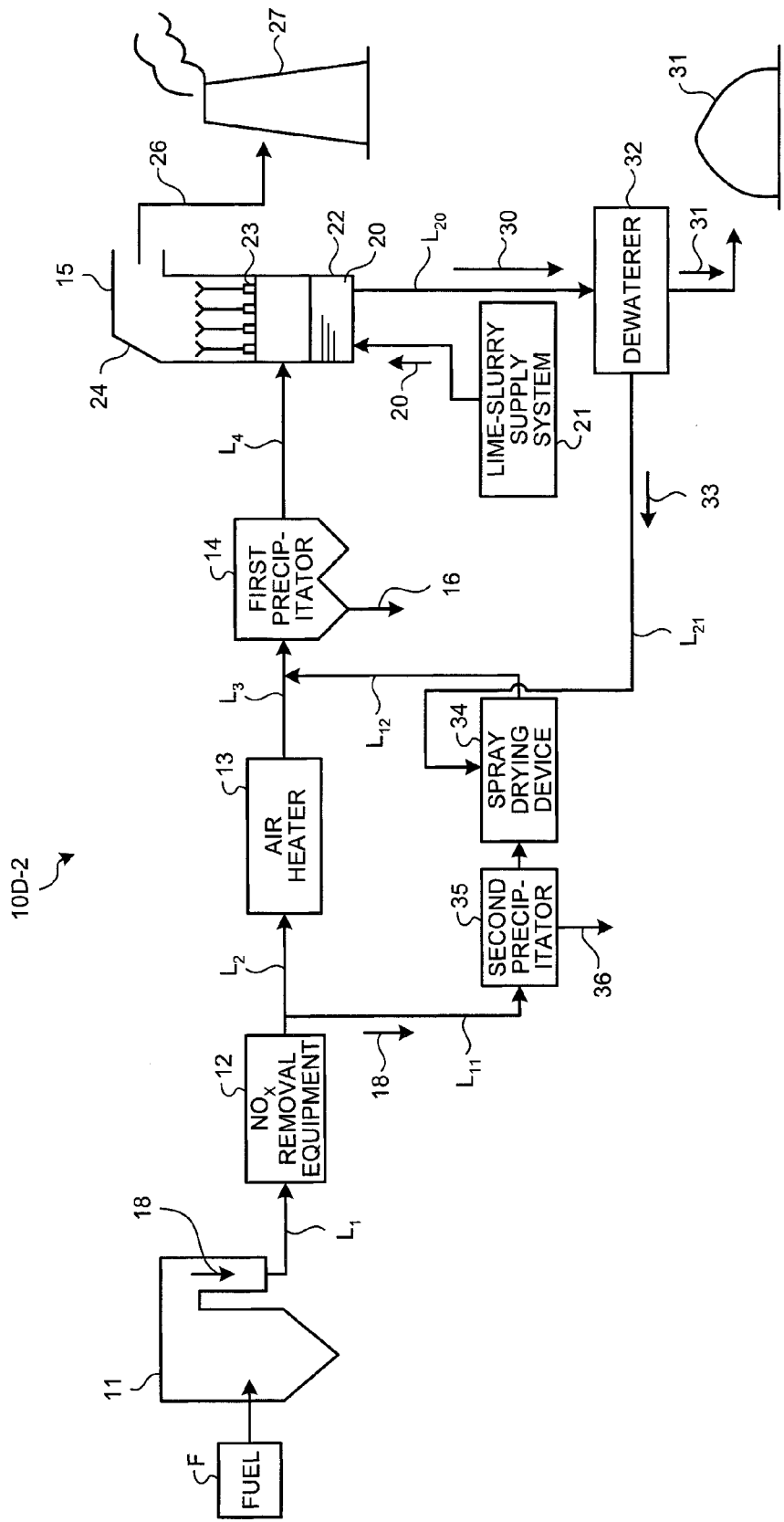
FIG. 4B is a schematic configuration diagram of another air pollution control system according to the third embodiment.

An air pollution control system according to a third embodiment of the present invention is explained next. Constituent elements identical to those in the first embodiment described above are denoted by like reference signs, and explanations thereof will be omitted. FIG. 4A is a schematic configuration diagram of the air pollution control system according to the third embodiment. FIG. 4B is a schematic configuration diagram of another air pollution control system according to the third embodiment. FIG. 4C is a schematic configuration diagram of still another air pollution control system according to the third embodiment. In an air pollution control system 10D-1 according to the third embodiment, as shown in FIG. 4A, a small second precipitator 35 is provided on the downstream side of the spray drying device 34 to reduce solid matters.

As the small second precipitator 35, for example, a bag filter or an electric dust collector can be used. Accordingly, a solid matter 36 can be reduced from the branched flue gas 18.

Therefore, a gas return line $L_{12}$ indicated by a dotted line can be installed so that the flue gas 18 is joined to the gas supply line $L_4$ on the downstream side (this holds true in the following embodiments), other than returning the flue gas 18 to the upstream side of the first precipitator 14.

Accordingly, the load on the first precipitator 14 can be reduced.

It can be appropriately changed whether to return the flue gas 18 to the upstream side or the downstream down of the first precipitator 14, according to an amount of generation of the solid matter 36 in the flue gas 18 in the spray drying device 34.

Further, as shown in FIG. 4B, in another air pollution control system 10D-2 according to the third embodiment, the small second precipitator 35 is provided on the upstream side of the spray drying device 34 to reduce the solid matter 36 beforehand.

Further, as shown in FIG. 4C, in another air pollution control system 10D-3 according to the third embodiment, small second precipitators 35A and 35B are provided on the upstream side and the downstream side of the spray drying device 34 provided in the flue-gas introducing line $L_{11}$ to reduce the solid matter 36 beforehand. In this case, the gas return line $L_{12}$ (indicated by a dotted line in the drawing) can be installed so that the flue gas 18 is returned to the downstream side of the first precipitator 14, which is preferable. Consequently, the load on the first precipitator 14 can be reduced.

[Fourth Embodiment]

Figure 5A:
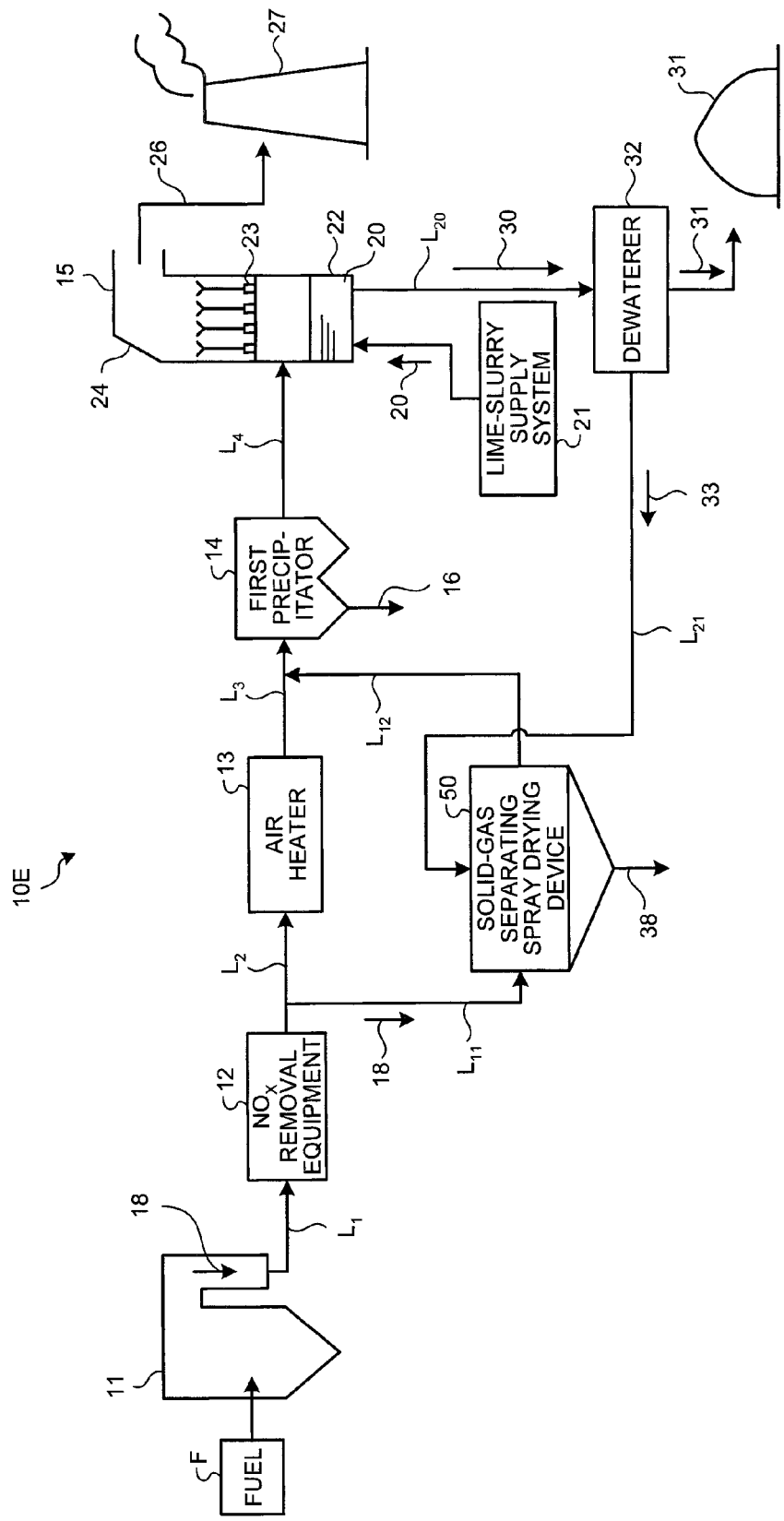
FIG. 5A is a schematic configuration diagram of an air pollution control system according to a fourth embodiment of the present invention.

An air pollution control system according to a fourth embodiment of the present invention is explained next. Constituent elements identical to those in the first embodiment described above are denoted by like reference signs, and explanations thereof will be omitted. FIG. 5A is a schematic configuration diagram of the air pollution control system according to the fourth embodiment. In an air pollution control system 10E according to the fourth embodiment, as shown in FIG. 5A, a solid-gas separating spray drying device 50 is used as the spray drying device, to perform spray drying of the dewatering filtration fluid 33. At the time of spray drying, a solid matter 38 is separated.

As the solid-gas separating spray drying device 50, a cyclone spray drying device can be used.

Figure 5B:
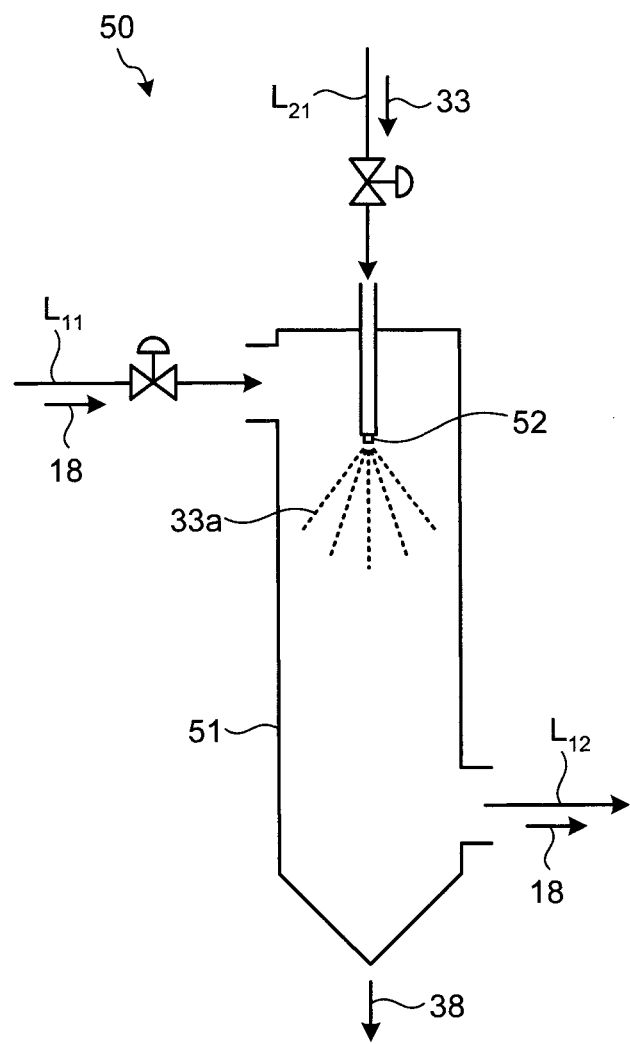
FIG. 5B is an example of a solid-gas separating spray drying device.

FIG. 5B depicts a downflow-type solid-gas separating spray drying device. As shown in FIG. 5B, in a downflow-type solid-gas separating spray drying device 50, the flue gas 18 is introduced from an upper part of a dryer body 51 to generate a downward laminar gas flow, so that a spray liquid 33a atomized from above by a spray nozzle 52 is dried.

The flue gas 18 having contributed to drying is discharged from a lower part of the dryer body 51, and returned to the gas supply line $L_3$ of the air heater 13 via the gas return line $L_{12}$. The solid matter 38 is discharged from a bottom part of the dryer body 51.

Figure 5C:
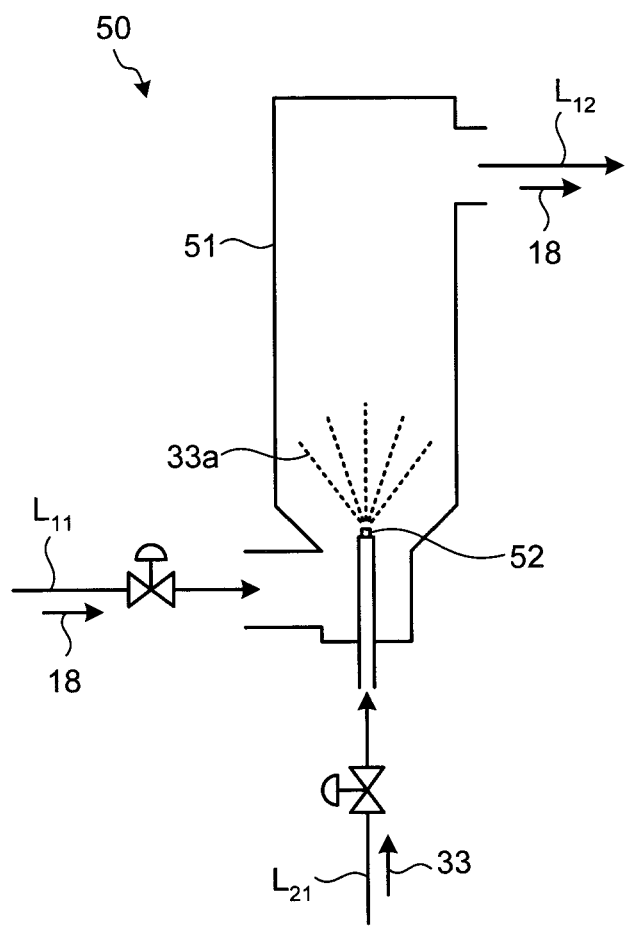
FIG. 5C is another example of a solid-gas separating spray drying device.

FIG. 5C depicts an upflow-type solid-gas separating spray drying device. As shown in FIG. 5C, in an upflow-type solid-gas separating spray drying device 50, the flue gas 18 is introduced from the lower part of the dryer body 51 to generate an upward laminar gas flow, so that the spray liquid 33a atomized from below by the spray nozzle 52 is dried.

The flue gas 18 having contributed to drying is discharged from the upper part of the dryer body 51, and returned to the gas supply line $L_3$ of the air heater 13 via the gas return line $L_{12}$.

Because the flue gas 18 flows in a direction opposite to a direction of the gravitational force, the flue gas 18 is brought into countercurrent contact with the spray liquid 33a of the dewatering filtration fluid 33, thereby improving drying efficiency of the dewatering filtration fluid 33.

Further, a small precipitator can be provided on the downstream side of the solid-gas separating spray drying device 50 as described in the third embodiment.

[Fifth Embodiment]

Figure 6:
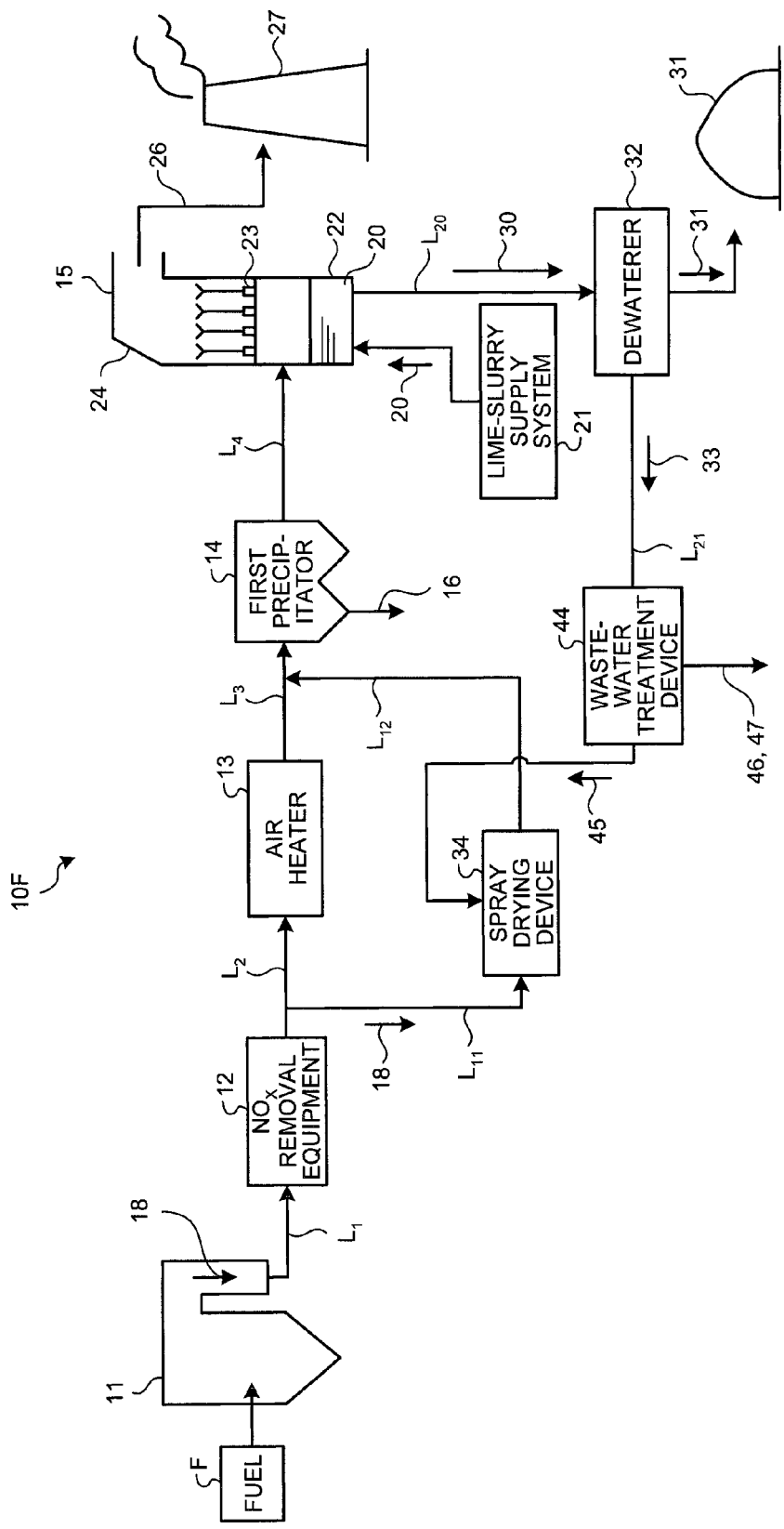
FIG. 6 is a schematic configuration diagram of an air pollution control system according to a fifth embodiment of the present invention.

An air pollution control system according to a fifth embodiment of the present invention is explained next. Constituent elements identical to those in the first embodiment described above are denoted by like reference signs, and explanations thereof will be omitted. FIG. 6 is a schematic configuration diagram of the air pollution control system according to the fifth embodiment. In an air pollution control system 10F shown in FIG. 6, a waste-water treatment device 44 is installed in the dewatering line $L_{21}$, and after harmful substances and the suspended substance in the dewatering filtration fluid 33 are removed by the waste-water treatment device 44, treated discharged water 45 is caused to flow into the spray drying device 34 and spray-dried.

The waste-water treatment device 44 includes a unit that removes substances remaining in the dewatering filtration fluid 33 such as mercury (which was not adsorbed on the gypsum 31), boron, and selenium (hereinafter, "mercury removing unit"), and a unit that removes halogen ions such as chlorine ion ($Cl^-$), bromine ion ($Br^-$), iodine ion ($I^-$), and fluorine ion ($F^-$) (hereinafter, "halogen-ion removing unit"), to separate mercury solids 46 and halogen ions 47 from each other.

Substances such as mercury, boron, and selenium are easily soluble in water, and volatilize when atomized to the flue gas 18. Therefore, these substances are hardly removed by the first precipitator 14. As a unit that removes these substances, a unit that removes the substances by precipitation through agglomeration by adding a sulfide coagulation aid, a unit that removes the substances by adsorption (a floating bed) using activated carbon, a unit that removes the substances by precipitation through the addition of a chelating agent, or a crystallizer can be mentioned. The harmful substances are solidified by the mercury removing unit exemplified above, and the solid is discharged to the outside of the system.

Because the halogen ions 47 have a property of suppressing adsorption of mercury on the gypsum 31 at the time of performing a desulfurization process by the desulfurizer 15, it is desired to remove the halogen ions 47 from the desulfurization discharged water 30. As the unit that removes the halogen ions 47, a concentrating unit using a reverse osmosis membrane, a concentrating unit using an ion exchange membrane, a concentrating unit using electrodialysis, a distilling unit, or a crystallizer can be mentioned. The halogen ions 47 are concentrated by the halogen-ion removing unit exemplified above, and the concentrate is discharged to the outside of the system.

The gypsum 31 adsorbing mercury chloride thereon is first separated from the desulfurization discharged water 30 discharged from the desulfurizer 15 by the dewaterer 32, and the gypsum 31 is discharged to the outside of the system. The dewatering filtration fluid 33 after the gypsum 31 has been removed is then fed to the waste-water treatment device 44 via the dewatering line $L_{21}$, where harmful substances such as mercury, boron, and selenium remaining in the dewatering filtration fluid 33 are removed by the mercury removing unit. The treated discharged water after mercury has been removed is fed to the halogen-ion removing unit, where halogen ions 47 are removed. The treated discharged water after halogen ions have been removed is fed to the spray drying device 34, where the treated waster water is spray-dried.

The waste-water treatment device 44 does not need to include both the mercury removing unit and the halogen-ion removing unit, and any one of the units is selected and installed according to the property of the dewatering filtration fluid 33. When mercury is sufficiently removed by the dewaterer 32 on the upstream of the waste-water treatment device 44 and a mercury content in the dewatering filtration fluid 33 is quite low or mercury is not contained, the process by the mercury removing unit can be omitted.

Further, the order of a mercury removing process and a halogen-ion removing process by the waste-water treatment device 44 is not particularly limited. That is, the halogen-ion removing process can be performed after performing the mercury removing process, or the mercury removing process can be performed after performing the halogen-ion removing process.

As described above, in the air pollution control system 10F according to the fifth embodiment, the gypsum 31, which is a bulky matter, is first separated from the desulfurization discharged water 30 discharged from the desulfurizer 15, fine substances such as mercury, boron, selenium, and halogen ions are removed, and the treated discharged water 45 is subjected to spray drying by the spray drying device 34. By having such a configuration, as in the second embodiment, the amount of dried particles generated due to evaporation of the discharged water can be reduced by the spray drying device 34, and an increase in a mercury concentration in the flue gas 18 can be suppressed.

[Sixth Embodiment]

Figure 7:
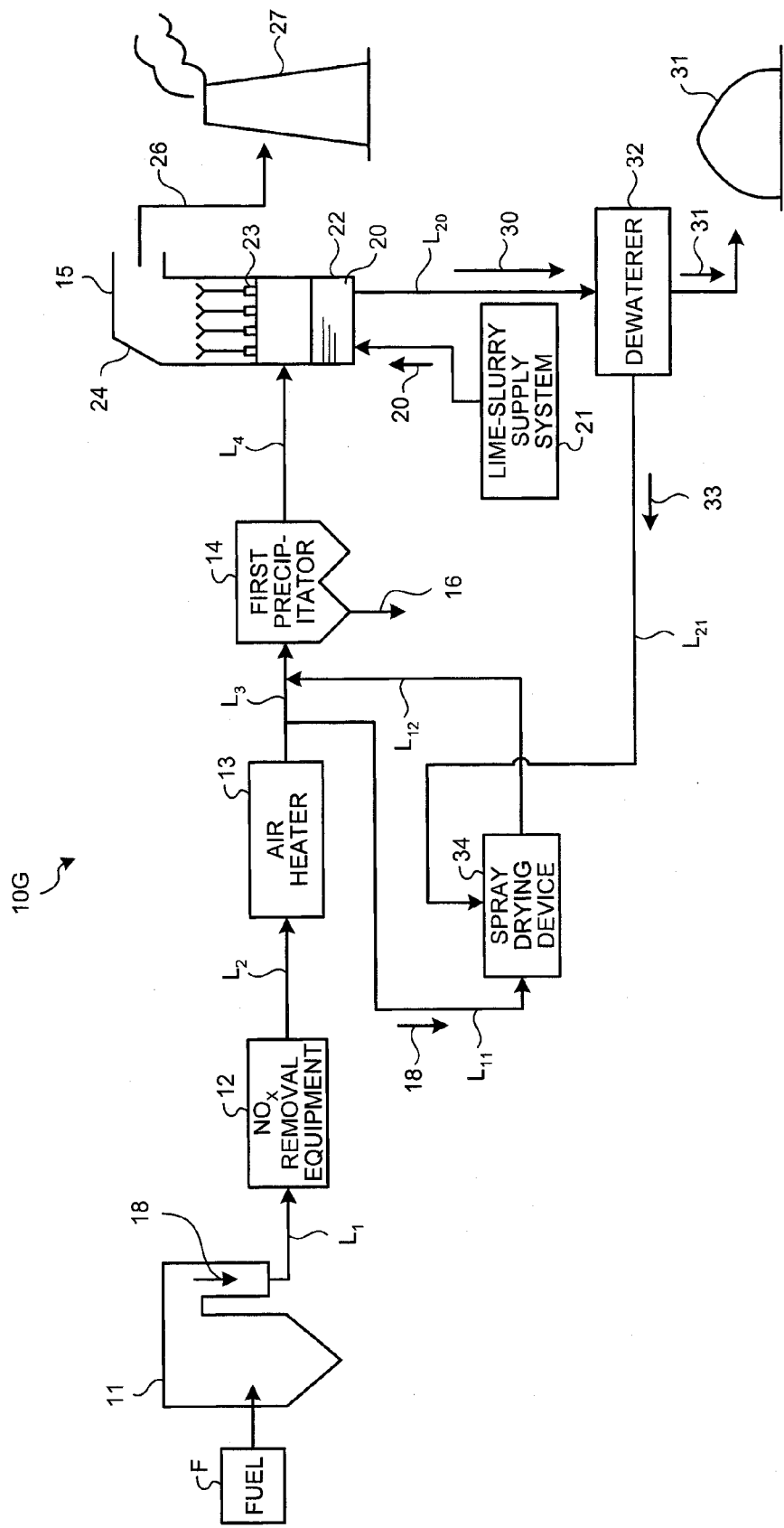
FIG. 7 is a schematic configuration diagram of an air pollution control system according to a sixth embodiment of the present invention.

An air pollution control system according to a sixth embodiment of the present invention is explained next. Constituent elements identical to those in the first embodiment described above are denoted by like reference signs, and explanations thereof will be omitted. FIG. 7 is a schematic configuration diagram of the air pollution control system according to the sixth embodiment. In an air pollution control system 10G according to the sixth embodiment, as shown in FIG. 7, the flue gas 18 is branched from the gas supply line $L_3$ of the air heater 13, and the flue gas 18 having contributed to spray drying by the spray drying device 34 is returned to the gas supply line $L_3$ at the same location.

Accordingly, a bypass line provided in the first embodiment is not required.

Figure 8A:
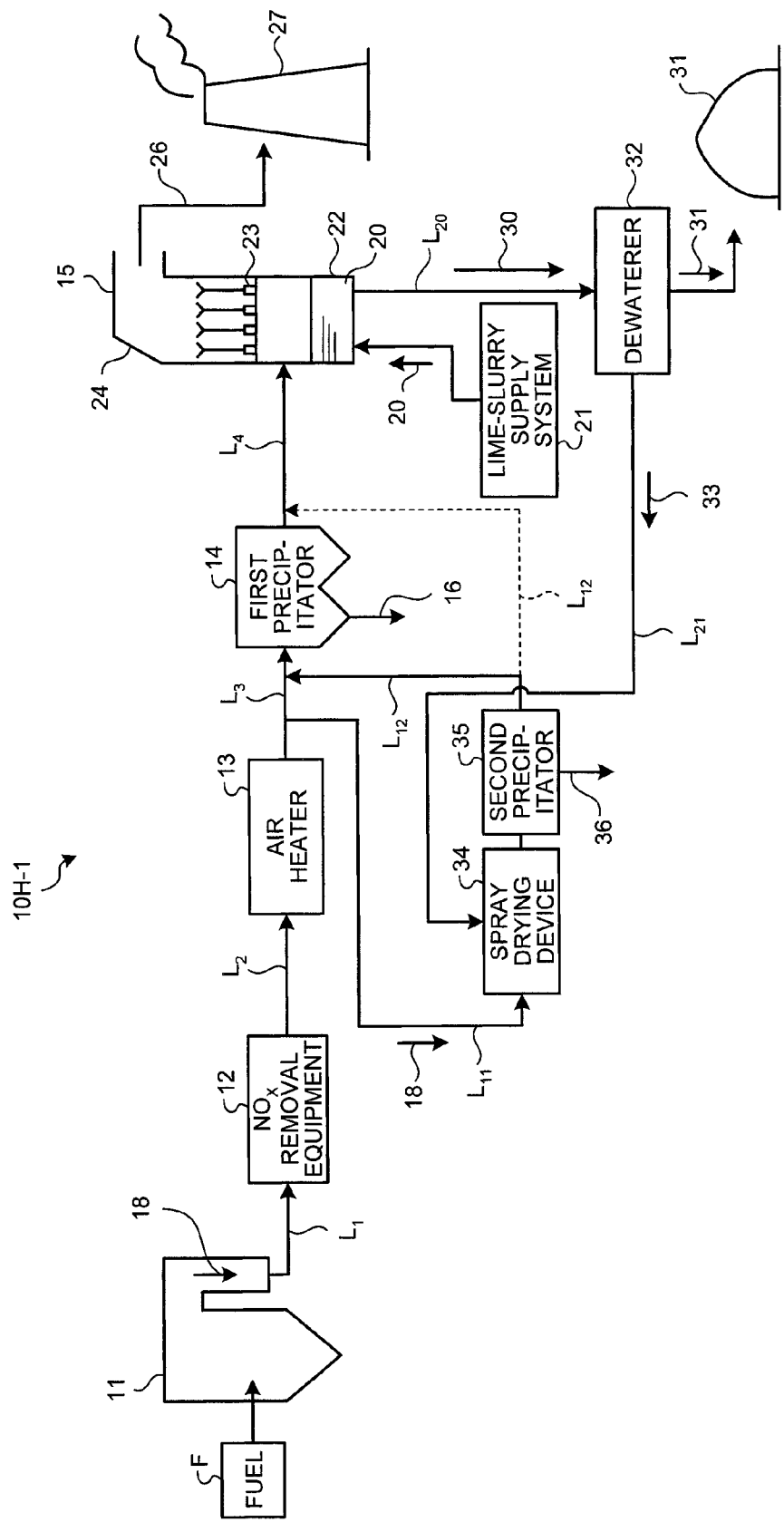
FIG. 8A is a schematic configuration diagram of another air pollution control system according to the sixth embodiment.
Figure 8B:
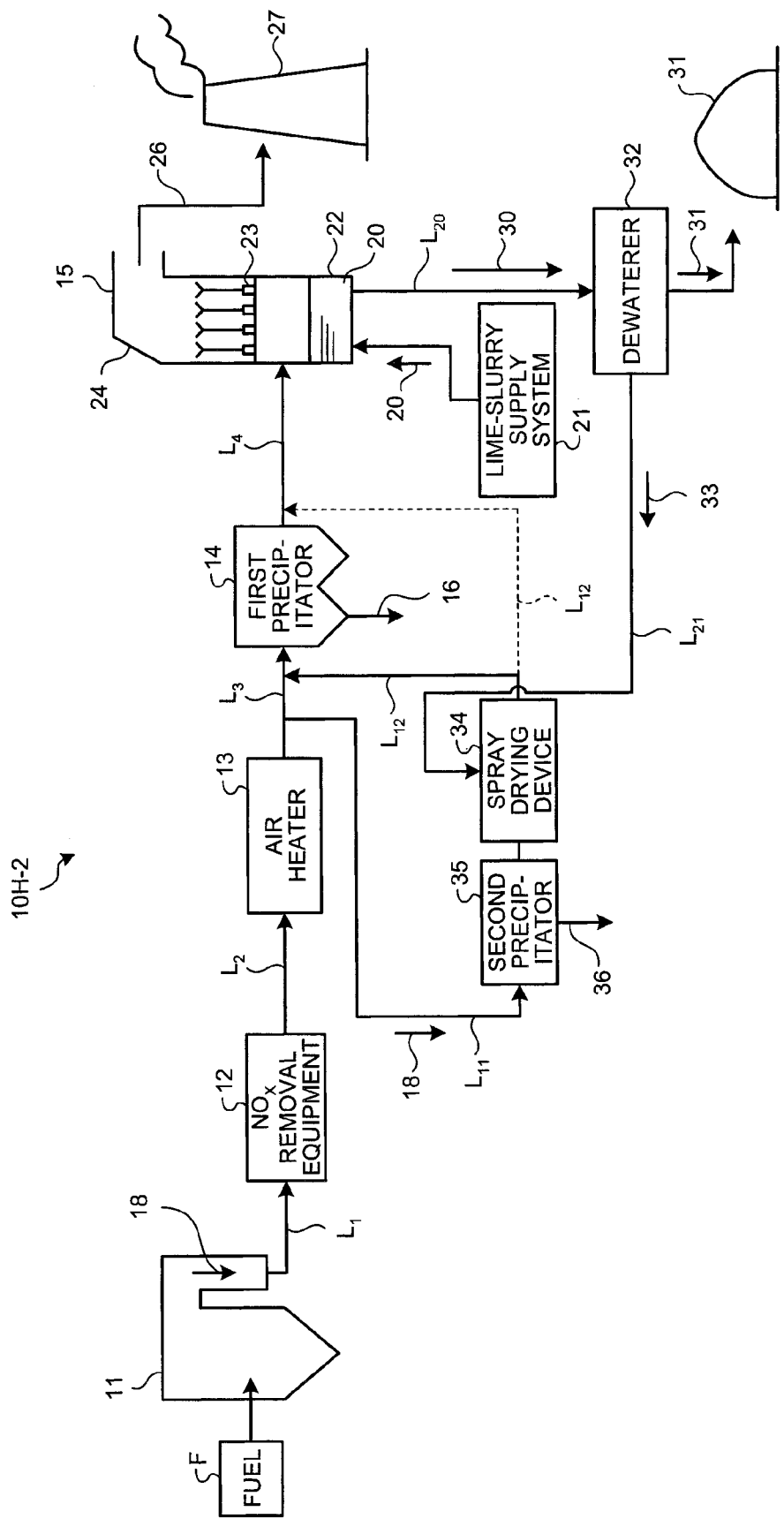
FIG. 8B is a schematic configuration diagram of still another air pollution control system according to the sixth embodiment.
Figure 8C:
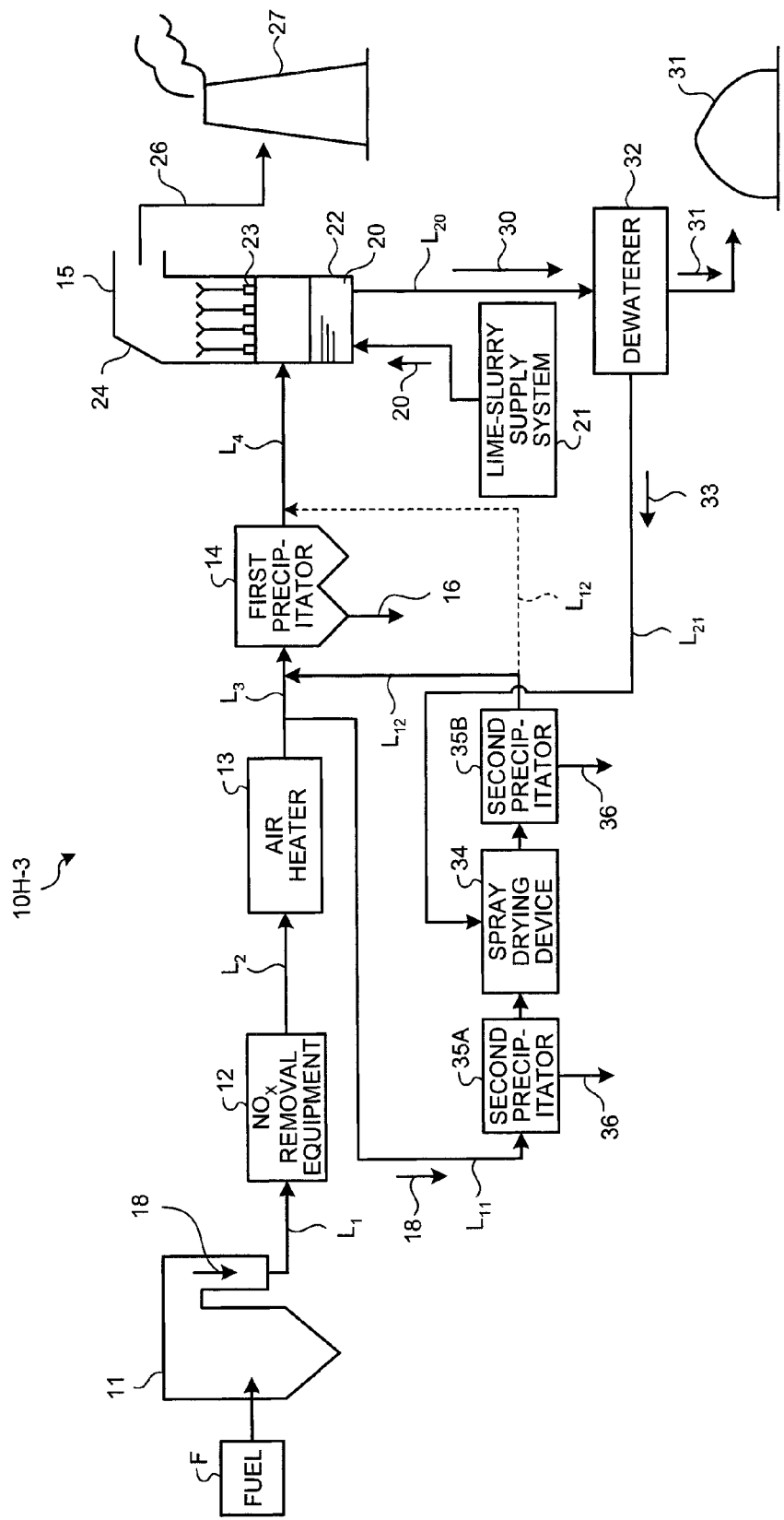
FIG. 8C is a schematic configuration diagram of still another air pollution control system according to the sixth embodiment.

FIGS. 8A to 8C are schematic configuration diagrams of other air pollution control systems according to the sixth embodiment.

In an air pollution control system 10H-1 shown in FIG. 8A, the small second precipitator 35 is provided on the downstream side of the spray drying device 34 as in the third embodiment, and the gas return line $L_{12}$ indicated by a dotted line can be installed so that the flue gas 18 is joined to the gas supply line $L_4$ on the downstream side, other than being returned to the upstream side of the first precipitator 14. Accordingly, the load on the first precipitator 14 can be reduced.

As shown in FIG. 8B, in another air pollution control system 10H-2 according to the sixth embodiment, the small second precipitator 35 is provided on the upstream side of the spray drying device 34, to reduce the solid matter 36 beforehand.

Further, as shown in FIG. 8C, in another air pollution control system 10H-3 according to the sixth embodiment, the small second precipitators 35A and 35B are provided on the upstream side and the downstream side of the spray drying device 34 to reduce the solid matter 36 beforehand. In this case, the flue gas 18 can be returned to the downstream side of the first precipitator 14, thereby reducing the load on the first precipitator 14, which is preferable.

[Seventh Embodiment]

Figure 9:
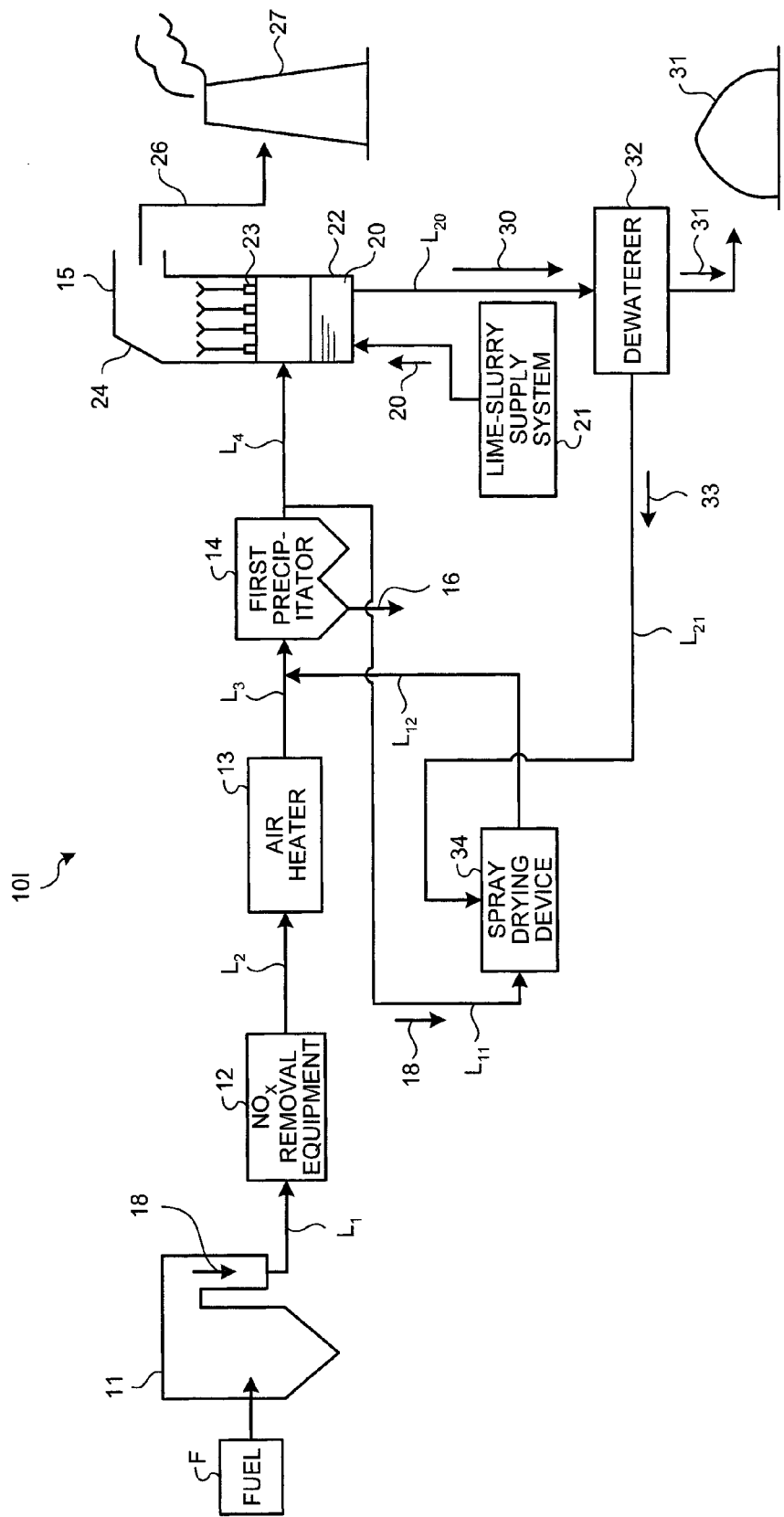
FIG. 9 is a schematic configuration diagram of an air pollution control system according to a seventh embodiment of the present invention.

An air pollution control system according to a seventh embodiment of the present invention is explained next. Constituent elements identical to those in the first embodiment described above are denoted by like reference signs, and explanations thereof will be omitted. FIG. 9 is a schematic configuration diagram of the air pollution control system according to the seventh embodiment. In an air pollution control system 10I according to the seventh embodiment, as shown in FIG. 9, the flue gas 18 is branched from the gas supply line $L_4$ on the downstream side of the first precipitator 14, and the flue gas 18 having contributed to spray drying by the spray drying device 34 is returned to the gas supply line $L_3$ on the upstream side of the first precipitator 14.

Accordingly, a bypass line provided in the first embodiment is not required.

Figure 10:
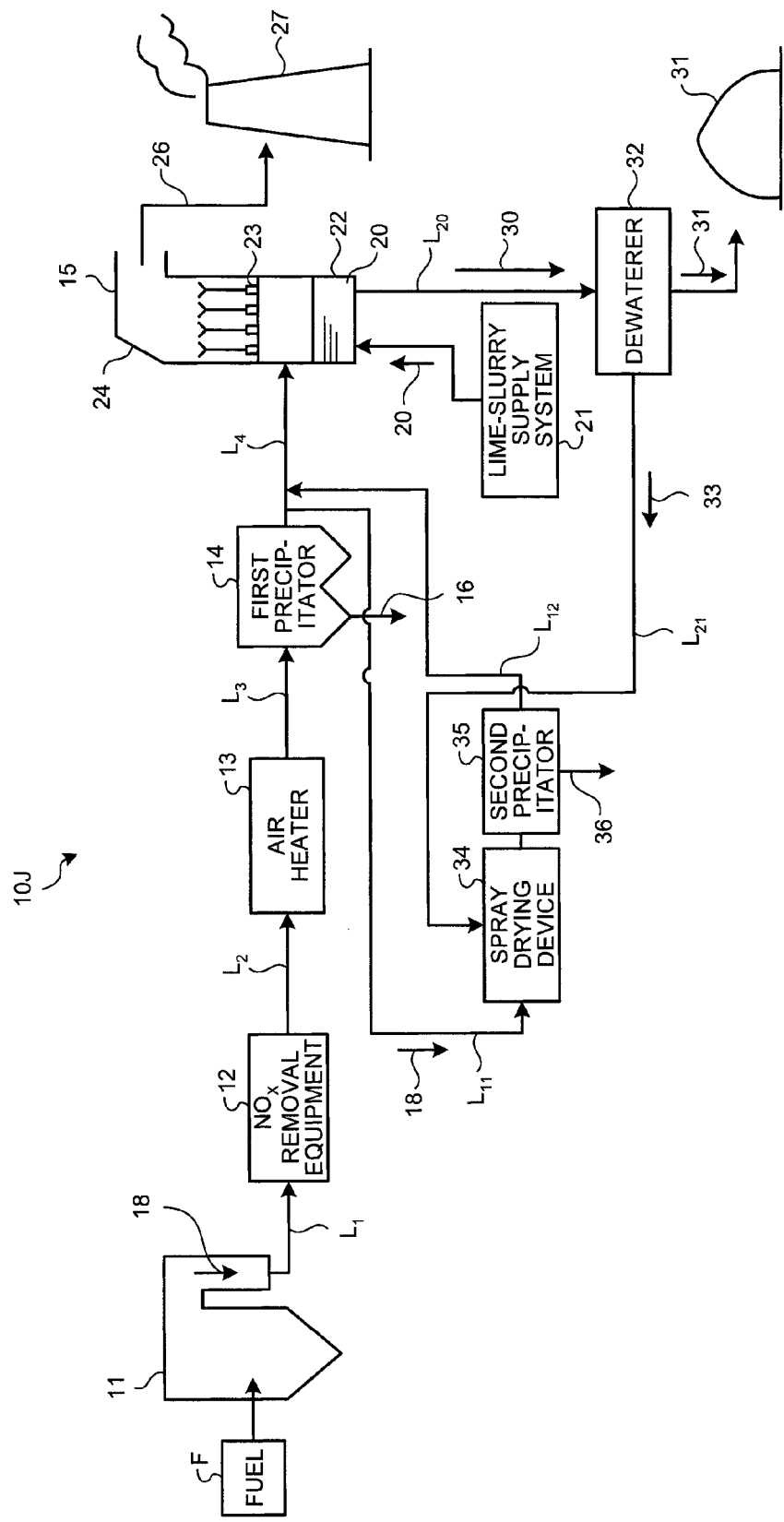
FIG. 10 is a schematic configuration diagram of another air pollution control system according to the seventh embodiment.

FIG. 10 is a schematic configuration diagram of another air pollution control system according to the seventh embodiment.

In an air pollution control system 10J shown in FIG. 10, the small second precipitator 35 is provided on the downstream side of the spray drying device 34, thereby reducing dust in the flue gas 18 having contributed to spray drying and returning the flue gas 18 to the gas supply line $L_4$ on the downstream side of the first precipitator 14.

Regarding the introduction of the flue gas 18, the flue gas 18 is introduced into the spray drying device 34 according to a difference in pressure drop between the flue gas line and the flue-gas introducing line $L_{11}$ or introduced by using an inducing pump according to need.

[Eighth Embodiment]

Figure 11:
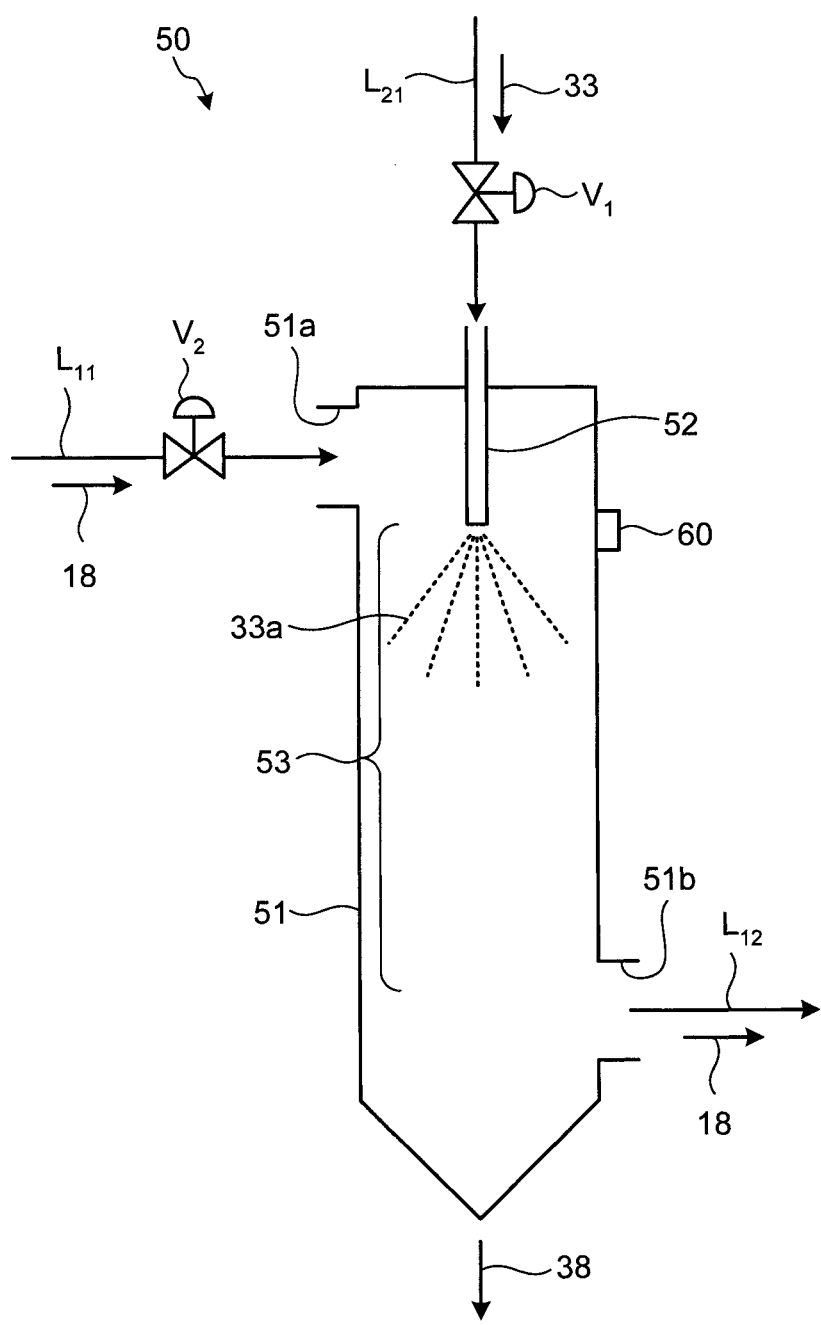
FIG. 11 is a schematic diagram of a spray drying device of a dewatering filtration fluid from desulfurization discharged water according to an eighth embodiment of the present invention.
Figure 13:
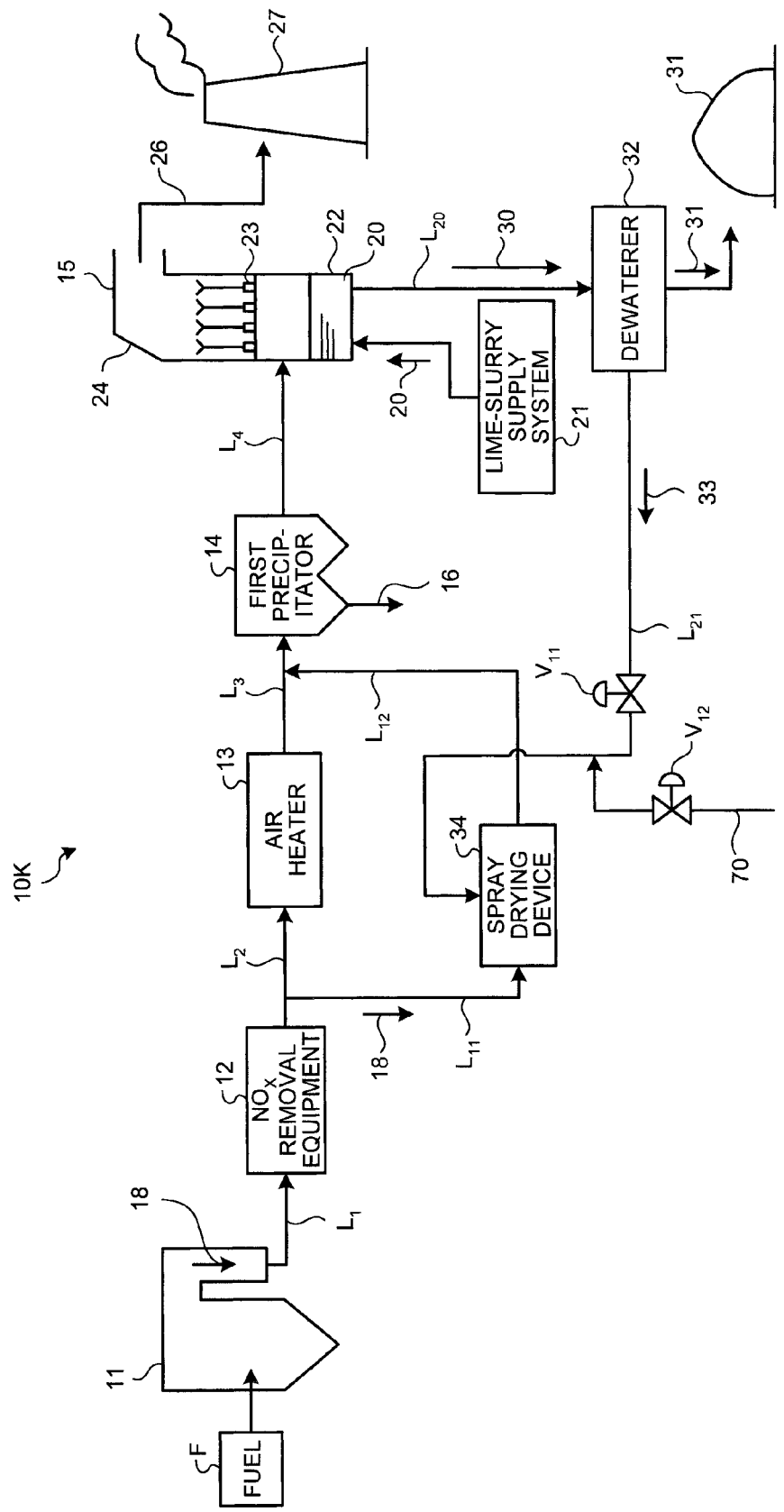
FIG. 13 is a schematic diagram of another spray drying device of a dewatering filtration fluid from desulfurization discharged water according to the eighth embodiment.

FIG. 11 is a schematic diagram of a spray drying device of a dewatering filtration fluid from desulfurization discharged water (a spray drying device) according to an eighth embodiment of the present invention. FIG. 13 is a schematic diagram of another spray drying device of a dewatering filtration fluid from desulfurization discharged water (a spray drying device) according to the eighth embodiment. A specific configuration of the downflow-type solid-gas separating spray drying device described in the fourth embodiment with reference to FIG. 5B is explained below.

As shown in FIG. 11, the solid-gas separating spray drying device 50 according to the eighth embodiment includes: the spray nozzle 52 that atomizes the dewatering filtration fluid 33 from the desulfurization discharged water into the spray drying device body 51; an introduction port 51a provided on the spray drying device body 51 to introduce the flue gas 18 for drying the spray liquid 33a; a dry area 53 provided in the spray drying device body 51 to dry the dewatering filtration fluid 33 by the flue gas 18; a discharge port 51b for discharging the flue gas 18 having contributed to drying; and a deposit monitor 60 that monitors an attached state of a deposit to the spray nozzle 52.

As the deposit monitor 60, an ultrasonic meter (microwave level sensor) or the like can be used. As the ultrasonic meter, for example, "micro range finder for high-temperature equipment, MicroRanger" (product name: manufactured by WADECO Ltd.) can be used.

Figure 12A:
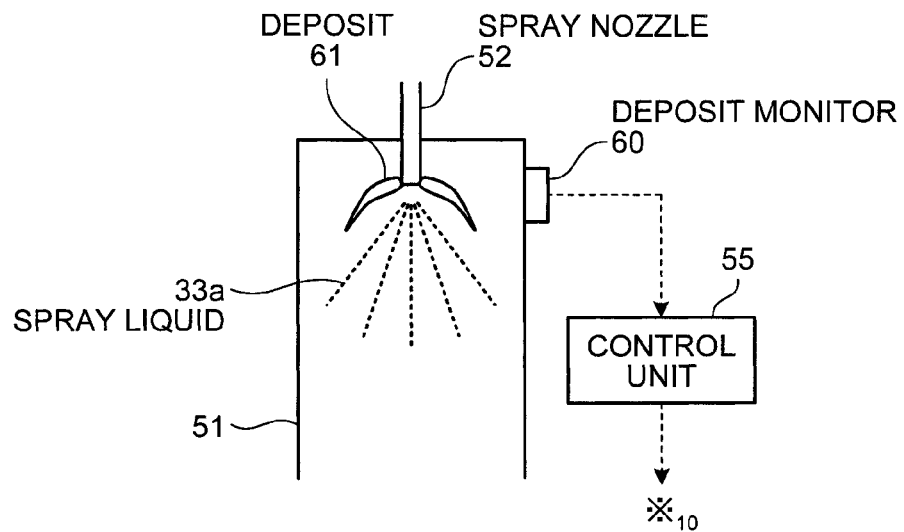
FIG. 12A is a schematic diagram of a monitoring state of a deposit by a deposit monitor.
Figure 12B:
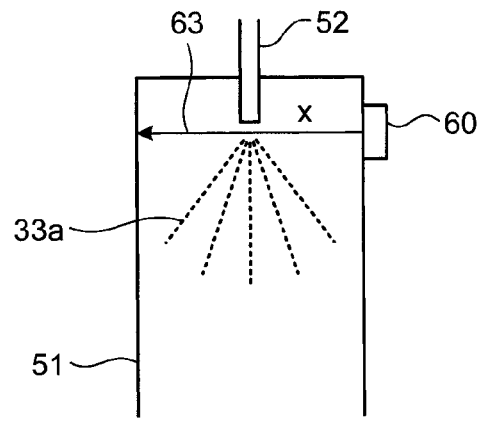
FIG. 12B is a schematic diagram of a monitoring state of a deposit by the deposit monitor.
Figure 12C:
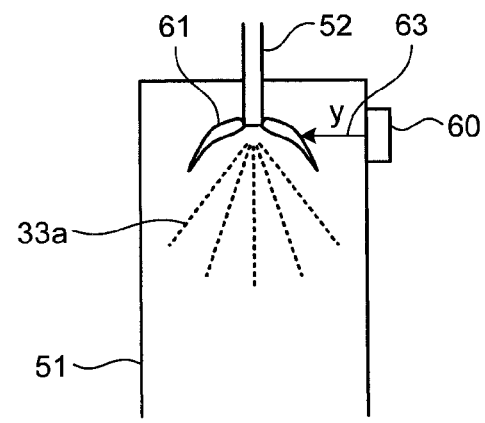
FIG. 12C is a schematic diagram of a monitoring state of a deposit by the deposit monitor.

FIGS. 12A to 12C are schematic diagrams of monitoring states of a deposit by a deposit monitor.

In FIG. 12A, the deposit monitor 60 that monitors the presence of deposit 61 is provided on a side wall of the spray drying device body 51, setting sights on a tip section of the spray nozzle 52.

As the deposit 61 of the dewatering filtration fluid 33, an umbrella scale grows at the tip section of the nozzle, which is an ash deposit in the flue gas 18.

At the time of atomizing the dewatering filtration fluid 33, the spray liquid 33a touches the umbrella deposit 61 to coarsen the spray liquid 33a, thereby deteriorating vaporizability of the dewatering filtration fluid 33.

As shown in FIGS. 12B and 12C, microwaves 63 are generated from the deposit monitor 60 to measure the distance to a position where the deposit is generated in a space at the tip section of the spray nozzle 52.

FIG. 12B depicts a case that there is no deposit 61. In this case, a measured distance becomes x, which is determined as normal (no deposit).

In contrast, FIG. 12C depicts a case that the deposit 61 is generated. In this case, a measured distance becomes y, which is determined as abnormal (there is a deposit).

When the growth of ash deposit is detected according to the measurement result of the deposit monitor 60, a command ($*_{10}$) to remove the deposit 61 is issued.

Other than installing the deposit monitor 60, the presence of deposit 61 can be confirmed by visual inspection by an operator.

When visual inspection by the operator is performed, inspection is performed by using a monitoring inspection hole (not shown) provided in the spray drying device body 51.

To remove the deposit, there are two methods; which are 1) a method in which supply of the dewatering filtration fluid is stopped, the dewatering filtration fluid is replaced by industrial water, and cleaning of the nozzle and the inside of pipes is performed by a spray-nozzle cleaning unit, and 2) a method in which the deposit is forcibly removed by an ash removing unit.

In an air pollution control system 10K, as shown in FIG. 13, replacement by the industrial water is performed by closing a valve $V_{11}$ to stop the supply of the dewatering filtration fluid 33 and supplying industrial water 70 by opening a valve $V_{12}$, and cleaning of the nozzle and the inside of pipes is performed by the spray-nozzle cleaning unit.

Replacement frequency by the industrial water 70 can be appropriately changed such as once per day to once to three times per day, according to a deposition degree of the deposit 61. Further, supply time of the industrial water 70 can be, for example, one hour per once.

At this time, a chemical solution for dissolving the deposit 61 can be supplied.

As the deposit removing unit, a beater (not shown) is provided on the spray nozzle 52 to drop the deposit. The beater can be installed at a position where spray does not reach.

Alternatively, as the deposit removing unit, a scraper having a circular blade provided on the spray nozzle 52 is operated to cut the deposit 61 attached to the tip of the nozzle.

Figure 14A:
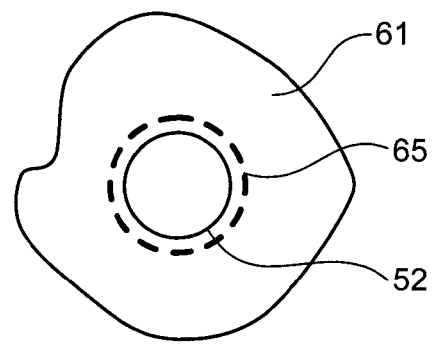
FIG. 14A depicts a state of removing a deposit by a scraper provided around a spray nozzle.
Figure 14B:
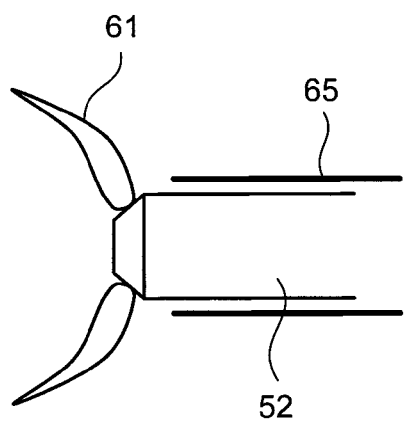
FIG. 14B depicts a state of removing a deposit by the scraper provided around the spray nozzle.
Figure 14C:
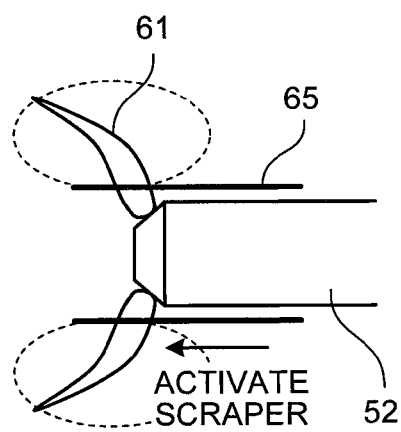
FIG. 14C depicts a state of removing a deposit by the scraper provided around the spray nozzle.

FIGS. 14A to 14C depict a state of removing a deposit by the scraper provided around the spray nozzle 52.

FIG. 14A is a front elevation of the spray nozzle, and depicts a state where the deposit 61 attaches to the circumference of the spray nozzle 52. FIG. 14B is a side view of the spray nozzle, and depicts a state where the scraper 65 is in a standby state. FIG. 14C is a side view of the spray nozzle, and depicts a state where the scraper 65 is activated and the deposit 61 is crushed and dropped off by the circular blade at the tip thereof. Dotted line indicates the deposit portion to be dropped off.

Further, by operating the scraper 65 not only when there is the deposit 61 but also frequently to some extent, early dropout of the deposit 61 can be effected.

[Ninth Embodiment]

Figure 15:
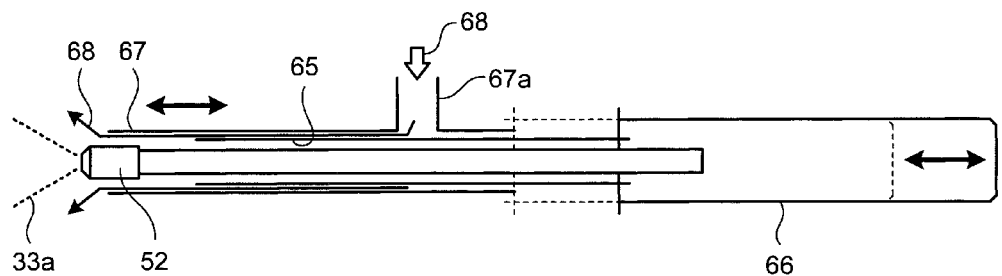
FIG. 15 is a schematic diagram of a spray nozzle according to a ninth embodiment of the present invention.

FIG. 15 is a schematic diagram of a spray nozzle according to a ninth embodiment of the present invention. Constituent elements identical to those in the eighth embodiment described above are denoted by like reference signs, and explanations thereof will be omitted.

As shown in FIG. 15, the spray nozzle 52 according to the ninth embodiment includes an outer cylinder 67 around the spray nozzle 52 so that barrier gas 68 is supplied from a supply port 67a, and air is supplied from the tip section of the nozzle to form an air film, thereby suppressing ash deposition due to soot and dust.

Regarding the supply of the barrier gas 68, the barrier gas 68 is injected at the same velocity as a jet atomization velocity for atomizing the spray liquid 33a, thereby preventing generation of peripheral eddy.

In the ninth embodiment, the scraper 65 is also provided, and the scraper 65 is operated as required to reduce the deposit 61.

In FIG. 15, reference sign 66 denotes an operation handle for the scraper.

According to the spray nozzle 52 of the ninth embodiment, the growth of the deposit 61 is suppressed by introducing the barrier gas 68, and stable atomization can be performed by the spray nozzle 52.

[Tenth Embodiment]

Figure 16:
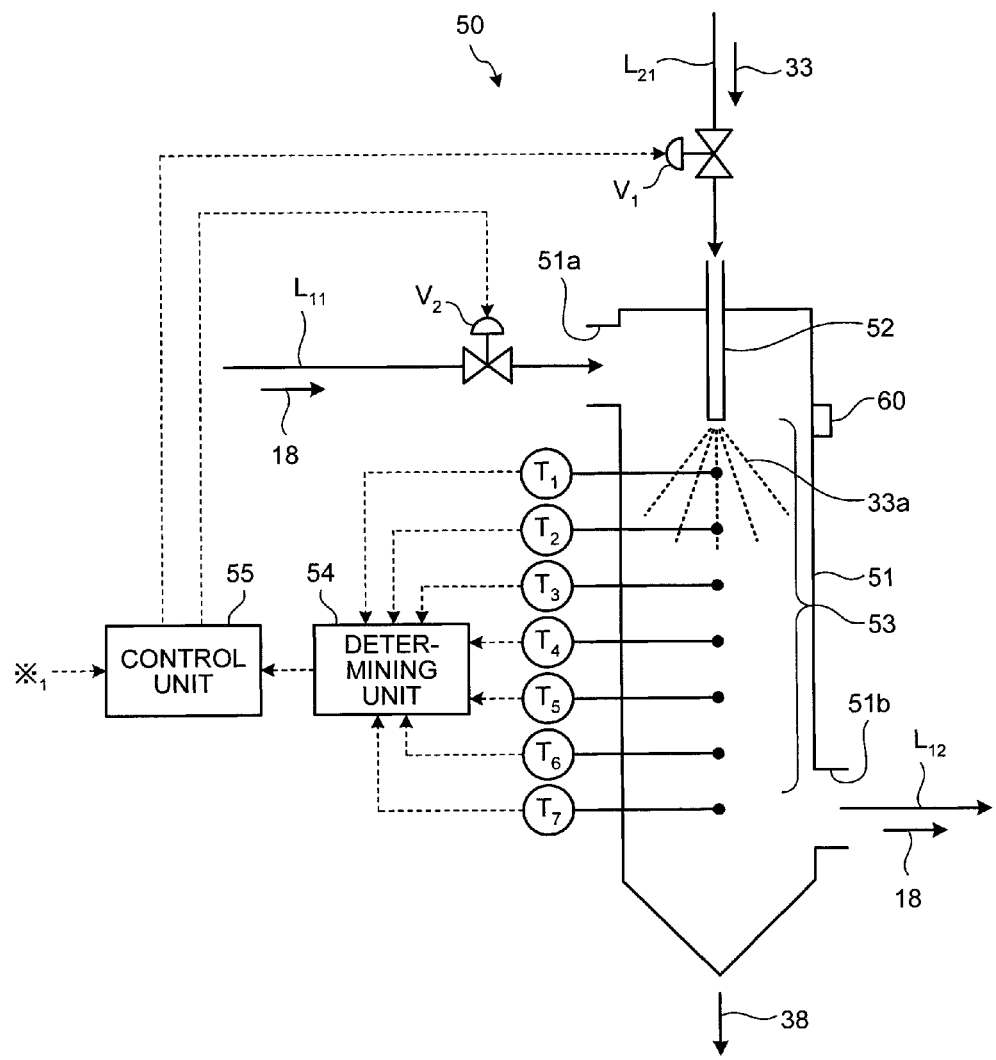
FIG. 16 is a schematic diagram of a spray drying device according to a tenth embodiment of the present invention.

FIG. 16 is a configuration diagram of a spray drying device according to a tenth embodiment of the present invention.

The solid-gas separating spray drying device 50 according to the tenth embodiment further includes thermometers $T_1$ to $T_7$ that measure an internal temperature in the dry area 53, a determining unit 54 that determines the spraying and drying state of the dewatering filtration fluid 33, and a control unit 55 that adjusts the flue gas 18 or the dewatering filtration fluid 33, when it is determined that spray drying is not sufficient as a result of determination by the determining unit 54.

In the tenth embodiment, the thermometers ($T_1$ to $T_7$) are provided at seven positions. However, the present invention is not limited thereto, and the number of thermometers can be appropriately changed according to the length of the dry area 53.

The thermometers are installed along a vertical shaft line of the dryer body 51. However, the present invention is not limited thereto, and the thermometers can be installed at any positions, so long as these can be installed at positions for confirming the evaporated state.

Figure 17A:
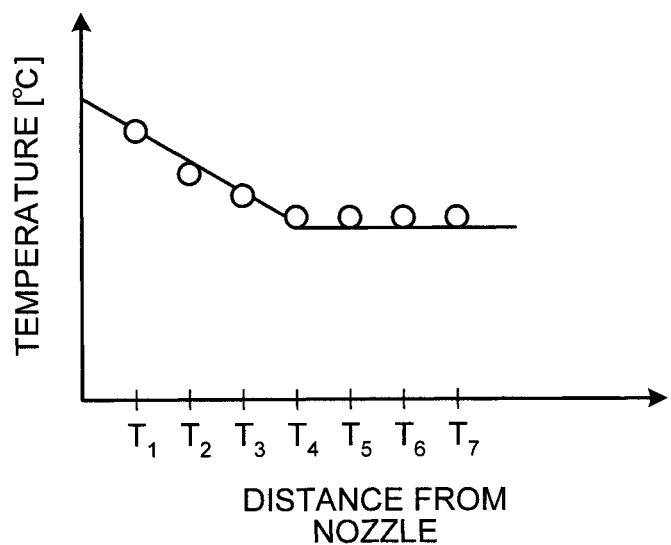
FIG. 17A is a relationship diagram between a distance from a nozzle to seven thermometers ($T_1$ to $T_7$) in a dryer body and measured temperatures.
Figure 17B:
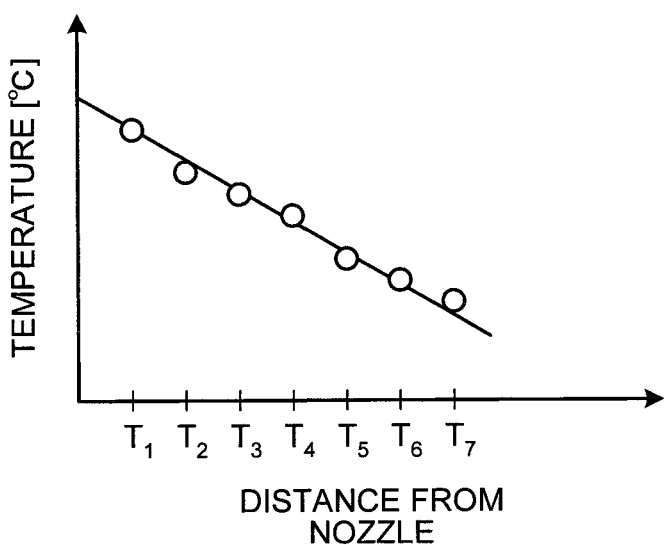
FIG. 17B is a relationship diagram between a distance from a nozzle to the seven thermometers ($T_1$ to $T_7$) in the dryer body and measured temperatures.

FIGS. 17A and 17B are relationship diagrams between a distance from the nozzle to the seven thermometers ($T_1$ to $T_7$) in the dryer body and measured temperatures.

In an evaporation process of the liquid, heat is required for temperature rise and evaporation of droplets of the spray liquid 33a. In this case, because heat of the flue gas 18 is used for the temperature rise and evaporation of the droplets, the temperature of the flue gas 18 decreases. By detecting a decrease in the temperature, the dry condition is determined.

FIG. 17A is a relationship diagram when the dry condition is favorable, and FIG. 17B is a relationship diagram when the dry condition is unfavorable.

In FIG. 17A, a temperature drop stops near $T_4$, and then the temperature becomes constant. This is because there is no droplet of the spray liquid 33a.

In contrast, in FIG. 17B, the temperature drop intermittently continues up to $T_7$. This is because droplets of the spray liquid 33a remain in a large amount.

The determining unit 54 makes a determination based on the above results.

As a result of the determination made by the determining unit 54, when the dry condition is favorable, spray drying of the dewatering filtration fluid 33 is continued.

On the other hand, as a result of the determination made by the determining unit 54, when it is determined that the dry condition is unfavorable, the control unit 55 adjusts the flue gas 18 or the dewatering filtration fluid 33.

Specifically, regarding the adjustment of the dewatering filtration fluid 33, the control unit 55 operates an adjustment valve $V_1$ to adjust a droplet size of the spray liquid 33a by increasing or decreasing the supply amount of the dewatering filtration fluid 33 or by increasing or decreasing the supply amount of atomized air to be supplied to the spray nozzle 52.

Further, a buffer tank that stores the dewatering filtration fluid 33 in a predetermined amount can be provided to perform adjustment.

Therefore, as shown in FIG. 16, flow amount information ($*_1$) acquired by measuring the flow amount of the dewatering filtration fluid 33 (not shown) is input to the control unit 55, and the control unit 55 adjusts an opening of the valve or adjusts the flow amount of a pump (not shown) based on the information.

The adjustment of the flue gas 18 is performed by controlling an introduction amount of the flue gas 18.

The adjustment of the introduction amount is performed by controlling an opening of a valve $V_2$ or a damper by pressure drop adjustment between the flue gas line and the flue-gas introducing line $L_{11}$.

Further, a series of the flue gas line and the flue-gas introducing line $L_{11}$ can be provided, and two or more spray drying devices 34 can be installed to adjust the supply amount of the flue gas 18.

Further, when it can be confirmed by the temperature measurement that the dry condition is transiently changes from a favorable condition to an unfavorable condition not only by an instantaneous determination but also by a measurement of a temperature profile over time, the operation described above for eliminating factors to insufficient drying can be performed.

According to the tenth embodiment, when the dewatering filtration fluid 33 acquired by removing the gypsum 31 from the desulfurization discharged water 30 discharged from the desulfurizer 15 is spray-dried by using a part of the flue gas 18, the spray drying of the dewatering filtration fluid 33 is performed while monitoring the temperature state in the dry area. Therefore, the spray-dried state can be stably held and zero liquid discharge of the desulfurization discharged water can be realized. Further, in the spray nozzle 52, the growth of the deposit 61 is monitored by the deposit monitor 60, stable operations can be performed by taking measures to remove the deposit 61 before abnormal atomization occurs.

In the spray drying method of the dewatering filtration fluid 33 in which the dewatering filtration fluid 33 is atomized into the dryer body 51 and the spray liquid 33a is dried by the flue gas 18 introduced therein, the atomization state of the spray nozzle 52 is confirmed to determine whether atomization of the dewatering filtration fluid 33 is appropriate. When atomization is inappropriate, the spray nozzle 52 is cleaned to remove the deposit 61 attached around the spray nozzle 52, thereby enabling to perform stable spray drying of the dewatering filtration fluid 33.

Further, the temperature distribution in the dry area 53 inside the dryer body 51 is measured, the dried state is monitored based on the temperature distribution in a direction of a gas flow, and when the dewatering filtration fluid 33 is dried insufficiently, the supply amounts of the flue gas and the dewatering filtration fluid 33 are adjusted, thereby enabling to perform stable spray drying of the dewatering filtration fluid 33.

According to the present invention, as the monitoring method of the atomized state, (1) an evaporation state is ascertained based on the temperature, (2) the growth of the deposit 61 is ascertained by ultrasonic waves or the like, and (a) when evaporation is insufficient, the introduced amounts of the flue gas 18 and the dewatering filtration fluid 33 are adjusted, or (b) when insufficient evaporation is caused by a change in droplet size of the spray liquid 33a, the spray nozzle 52 is cleaned or an ash exhauster is operated, thereby enabling to return to an appropriate atomized state and perform stable spray drying of the dewatering filtration fluid 33.

[Reference Signs List]
10A to 10K air pollution control system
11 boiler
12 $NO_x$ removal equipment
13 air heater
14 first precipitator
15 desulfurizer
16 collected dust
18 flue gas
20 lime slurry
21 lime-slurry supply system
22 column bottom part
23 nozzle
24 column top part
26 purged gas
27 stack
30 desulfurization discharged water
32 dewaterer
33 dewatering filtration fluid
34 spray drying device
35, 35A, 35B second precipitator
44 waste-water treatment device
45 treated discharged water
50 solid-gas separating spray drying device
51 dryer body
52 spray nozzle
53 dry area
54 determining unit
55 control unit
60 deposit monitor
61 deposit
63 microwave
65 scraper
66 operation handle
67 outer cylinder
68 barrier gas
70 industrial water

The invention claimed is:

1. An air pollution control system comprising:
a boiler that burns fuel;
an air heater that recovers heat of flue gas from the boiler;
a first precipitator that reduces dust in the flue gas after heat recovery;
a desulfurizer that reduces sulfur oxides in the flue gas after dust reduction by an absorbent;
a dewaterer that reduces gypsum from desulfurization discharged water discharged from the desulfurizer;
a spray drying device including an atomizer that atomizes a dewatering filtration fluid discharged from the dewaterer;
a flue-gas introducing line that introduces a part of the flue gas into the spray drying device, and
a dewatering branch line that supplies a dewatering filtration fluid from the dewaterer to collected dust.

2. The air pollution control system of claim 1, further comprising a solid-liquid separating unit that reduces suspended solids in a dewatering filtration fluid from the dewaterer.

3. The air pollution control system of claim 1, wherein the spray drying device is a solid-gas separating spray drying device.

4. The air pollution control system of claim 1, further comprising a waste-water treatment device that reduces harmful substances in a dewatering filtration fluid discharged from the dewaterer, the waste-water treatment device including:
a mercury removing unit for removing mercury, and
a halogen-ion removing unit for, removing halogen ions.

5. The air pollution control system of claim 1, wherein a second precipitator is provided either on an upstream side or a downstream side of the spray drying device provided in the flue-gas introducing line or on both sides.

6. The air pollution control system of claim 1, wherein a branching position of the flue gas is on an upstream side of the air heater, and the flue gas from the spray drying device is returned to between the air heater and the first precipitator.

7. The air pollution control system of claim 6, wherein a branching position of the flue gas is on an upstream side of the air heater, and the flue gas from the spray drying device is returned to between the air heater and the first precipitator or to a downstream side of the first precipitator.

8. The air pollution control system of claim 1, wherein a branching position of the flue gas is between the air heater and the first precipitator, and flue gas from the spray drying device is returned to between the air heater and the first precipitator.

9. The air pollution control system of claim 5, wherein a branching position of the flue gas is between the air heater and the first precipitator, and the flue gas from the spray drying device is returned to between the air heater and the first precipitator or to a downstream side of the first precipitator.

10. The air pollution control system of claim 1, wherein a branching position of the flue gas is between the first precipitator and the desulfurizer, and the flue gas from the spray drying device is returned to between the air heater and the first precipitator or to a downstream side of the first precipitator.

11. The air pollution control system of claim 5, wherein a branching position of the flue gas is between the first precipitator and the desulfurizer, and the flue gas from the spray drying device is returned to the first precipitator and the desulfurizer.

* * * * *